US 8,916,824 B2

(12) United States Patent
Noda

(10) Patent No.: US 8,916,824 B2
(45) Date of Patent: Dec. 23, 2014

(54) PYROELECTRIC LIGHT DETECTOR, PYROELECTRIC LIGHT DETECTING DEVICE, AND ELECTRONIC DEVICE

(71) Applicant: Seiko Epson Corporation, Tokyo (JP)

(72) Inventor: Takafumi Noda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 241 days.

(21) Appl. No.: 13/662,617

(22) Filed: Oct. 29, 2012

(65) Prior Publication Data

US 2013/0105693 A1    May 2, 2013

(30) Foreign Application Priority Data

Oct. 31, 2011  (JP) .................................. 2011-238552
Oct. 31, 2011  (JP) .................................. 2011-238553

(51) Int. Cl.
| | |
|---|---|
| *G01J 5/00* | (2006.01) |
| *G01J 5/02* | (2006.01) |
| *G01J 5/34* | (2006.01) |
| *G01J 5/04* | (2006.01) |

(52) U.S. Cl.
CPC .. *G01J 5/34* (2013.01); *G01J 5/024* (2013.01); *G01J 5/0225* (2013.01); *G01J 5/046* (2013.01)
USPC .................................................... 250/338.3

(58) Field of Classification Search
CPC ............ G01J 5/0225; G01J 5/34; G01J 5/046
USPC .......................................... 250/338.1–338.5
See application file for complete search history.

(56) References Cited

U.S. PATENT DOCUMENTS

| | | | | |
|---|---|---|---|---|
| 4,532,424 | A | * | 7/1985 | Cheung ...................... 250/338.3 |
| 4,598,163 | A | * | 7/1986 | Ito ................................. 136/213 |
| 5,293,041 | A | * | 3/1994 | Kruse, Jr. ................... 250/338.3 |
| 5,602,043 | A | * | 2/1997 | Beratan et al. .................. 438/54 |
| 6,326,621 | B1 | * | 12/2001 | Kamada et al. ............ 250/338.2 |
| 7,732,770 | B2 | | 6/2010 | Han et al. |
| 2004/0173823 | A1 | * | 9/2004 | Murai ........................... 257/252 |
| 2013/0023063 | A1 | * | 1/2013 | Matsushima et al. ............. 438/3 |
| 2013/0221220 | A1 | * | 8/2013 | Fujiwara .................... 250/338.3 |

FOREIGN PATENT DOCUMENTS

| | | |
|---|---|---|
| JP | 05-187917 A | 7/1993 |
| JP | 08-271344 A | 10/1996 |

* cited by examiner

*Primary Examiner* — Kiho Kim
(74) *Attorney, Agent, or Firm* — Global IP Counselors, LLP

(57) ABSTRACT

A pyroelectric light detector has a base unit, a support member, and a plurality of pyroelectric capacitors containing pyroelectric bodies. The support member includes a first surface and a second surface facing opposite the first surface, and has a hollow space section formed between the second surface and the base unit. The plurality of pyroelectric capacitors are supported by the support member. The plurality of pyroelectric capacitors supported by the support member are electrically connected in series in a direction matching the polarization direction. The position of the projection point for which the center of gravity of the light absorption region corresponding to the pyroelectric capacitor is projected two dimensionally with a plan view can be made to exist inside the region in which the contour line of the pyroelectric body of the pyroelectric capacitor is projected two dimensionally.

21 Claims, 18 Drawing Sheets

PYROELECTRIC LIGHT DETECTOR, PYROELECTRIC LIGHT DETECTING DEVICE, AND ELECTRONIC DEVICE

CROSS-REFERENCE TO RELATED APPLICATIONS

This application claims priority to Japanese Patent Application No. 2011-238552 filed on Oct. 31, 2011 and Japanese Patent Application No. 2011-238553 filed on Oct. 31, 2011. The entire disclosure of Japanese Patent Application Nos. 2011-238552 and 2011-238553 is hereby incorporated herein by reference.

BACKGROUND

1. Technical Field

The present invention relates to a pyroelectric light detector, a pyroelectric light detecting device, an electronic device and the like.

2. Background Technology

Thermal type light detectors are known as light sensors. Thermal type light detectors absorb light radiated from an object using a light absorption layer, convert the light to heat, and measure changes in temperature using a heat detecting element. As thermal type light detectors, for example, there are thermopiles that directly detect rises in temperature accompanying light absorption as thermoelectric power, pyroelectric elements for detecting electric polarity changes, bolomoters that detect rises in temperature as resistance changes and the like. The thermal type light detectors have a feature of having a broad band of wavelengths that can be detected.

With the pyroelectric light detector which is an example of a thermal type light detector, infrared light which is one example of light radiated from an object is absorbed and converted to heat by an infrared light absorption layer, for example. By giving that heat to a pyroelectric body, a change occurs in the pyroelectric body's spontaneous polarization volume. The infrared light volume is detected by pyroelectric current based on the change volume.

In recent years, using semiconductor manufacturing technology (MEMS technology or the like), attempts have been made at manufacturing more compact thermal type light detectors. In Unexamined Patent Publication H08-271344, noted is a monolithic heat sensitive sensor equipped with a pyroelectric layer. With this pyroelectric light detector, a pyroelectric light detecting element is formed using semiconductor manufacturing technology on an integrated circuit substrate. In FIG. 6 of Unexamined Patent Publication H08-271344, disclosed is a constitution for which two pyroelectric elements, constituted with a pyroelectric material thin film consisting of a dielectric sandwiched by electrodes, are connected by a common plate.

Also, in FIG. 2 of Unexamined Patent Publication 1405-187917, noted is an infrared sensor equipped with a pyroelectric film. With the sensor equipped with this pyroelectric film, a lower electrode, pyroelectric film, and upper electrode are formed in that order on an insulating film supported on the substrate, and a light absorbing film is formed on the upper electrode and the pyroelectric film.

SUMMARY

However, according to the well-known technology, depending on the kind of printing data, it often happens that while one processor is conducting processing, another processor is in a waiting state because it has no processing to be conducted. This causes a problem that processing cannot be conducted at sufficiently high speed. There is also another problem that even if the data size of image data is small, power consumption of processors becomes large when a plurality of processors are simultaneously driven.

The invention has been made to address the above-described circumstances, and an advantage of the invention is to provide a printing device and a printing method of the printing device which can quickly conduct image processing to complicated image data having a large volume and having a frequently-changing contrast, and are excellent in power-saving performance by efficiently driving processors.

One mode of the invention relates to a pyroelectric light detector including:

a base unit, support members including a first surface and a second surface facing opposite the first surface, arranged via a hollow space section between the second surface and the base unit, and a plurality of pyroelectric capacitors supported by the support members and respectively containing pyroelectric bodies, wherein the plurality of pyroelectric capacitors are electrically connected in series in the direction that matches the polarization direction.

The pyroelectric light detector of another mode of the invention relates to a pyroelectric light detector including a base unit, support members including a first surface and a second surface facing opposite the first surface, arranged via a hollow space section between the second surface and the base unit, a plurality of pyroelectric capacitors supported by the support member and respectively containing pyroelectric bodies, and a light absorbing layer provided in contact respectively with the plurality of pyroelectric capacitors, wherein the plurality of pyroelectric capacitors are electrically connected, the light absorbing layer consists of a plurality of light absorption regions corresponding to each of the plurality of pyroelectric capacitors, and with a plan view from the base unit thickness direction, the center of gravity of each of the plurality of light absorption regions exists at a position overlapping the pyroelectric body of each one of the pyroelectric capacitors to which each of the plurality of light absorption regions corresponds.

Yet another mode of the invention defines a pyroelectric light detecting device for which the previously described pyroelectric light detectors are two-dimensionally arranged along two intersecting straight line directions.

As a result, a pyroelectric light detecting device (pyroelectric light array sensor) is realized for which a plurality of pyroelectric light detectors (pyroelectric light detecting elements) are arranged two dimensionally (e.g. arranged in array form along each of two orthogonal axes).

Yet another mode of the invention defines an electronic device having the pyroelectric light detector or the pyroelectric light detecting device described previously.

BRIEF DESCRIPTION OF THE DRAWINGS

Referring now to the attached drawings which form a part of this original disclosure.

DETAILED DESCRIPTION OF EXEMPLARY EMBODIMENTS

Figure 1A:
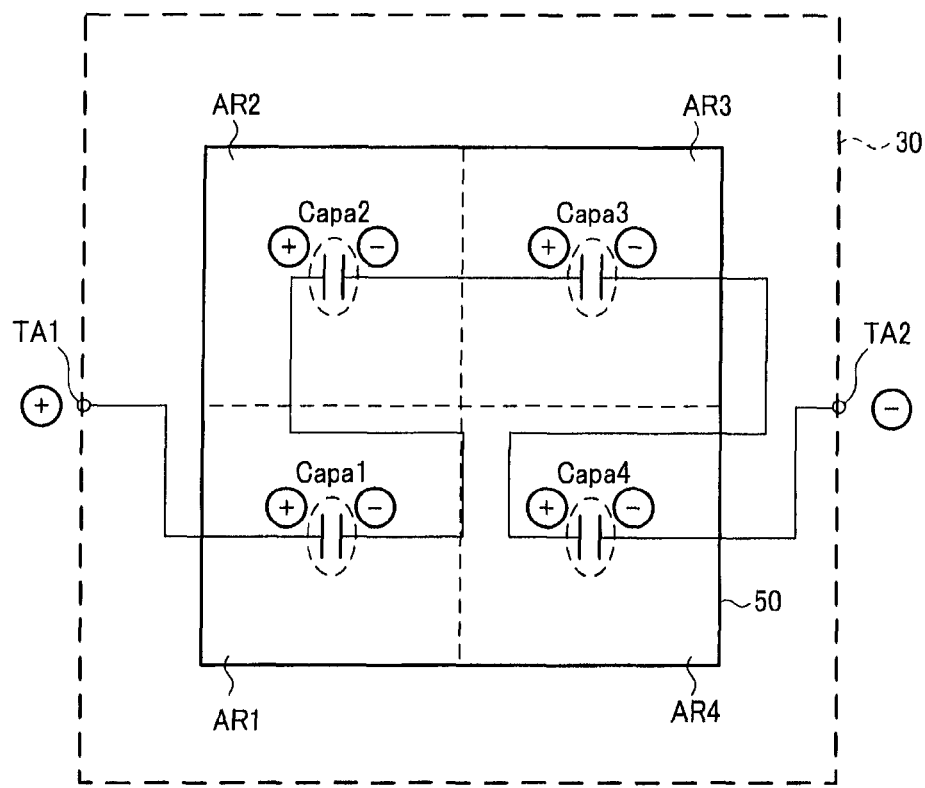
FIGS. 1A and 1B are drawings showing a schematic plan view and a two dimensional projected plane of a pyroelectric light detector having four capacitors of a first embodiment of the invention.

In recent years, there has been demand for an increase in the detection output of pyroelectric light detectors. The output voltage based on the spontaneous polarization volume with a pyroelectric capacitor generated by heat due to incident light depends on things such as the light receiving area surface area, the pyroelectric capacitor surface area, the pyroelectric capacitor resistance and the like.

With at least one mode of the invention, it is possible to increase the detection output of the pyroelectric light detector.

With at least one other mode of the invention, the heat generated in a plurality of light absorption regions is efficiently transmitted to the pyroelectric bodies of a plurality of pyroelectric capacitors, making it possible to increase the detection output of the pyroelectric light detector.

Means for Solving the Problem (1) One mode of the invention relates to a pyroelectric light detector including:

a base unit, support members including a first surface and a second surface facing opposite the first surface, arranged via a hollow space section between the second surface and the base unit, and a plurality of pyroelectric capacitors supported by the support members and respectively containing pyroelectric bodies, wherein the plurality of pyroelectric capacitors are electrically connected in series in the direction that matches the polarization direction.

When the capacity of the n serially connected pyroelectric capacitors are respectively set as C, the combined capacity of the n pyroelectric capacitors is C/n, and the combined resistance Rp of the n pyroelectric capacitors is n/C. Using the fact that this combined resistance Rp becomes n times the resistance of a single pyroelectric capacitor, it is possible to make the output voltage accompanying spontaneous polarization of the pyroelectric capacitor a magnitude of n times.

(2) With one mode of the invention, it is possible for each of the pyroelectric bodies of the plurality of pyroelectric capacitors to have the side surface covered by an electrically insulated metal compound layer. The pyroelectric body is an oxide, and when it is deoxidized, oxygen loss occurs. The metal compound layer has deoxidizing gas barrier properties, making it possible to suppress deoxidation of the pyroelectric body. In this way, it is possible to suppress oxygen loss of the pyroelectric body, so it is possible to make the pyroelectric capacitors more compact, and to install a plurality of pyroelectric capacitors and serially connect them on a single support member.

(3) With one mode of the invention, it is possible for each of the plurality of pyroelectric capacitors to include a first electrode provided on the support member, a second electrode facing opposite the first electrode via the pyroelectric body, and also a wiring section connected to a region of the first electrode not facing opposite the second electrode.

By using a so-called planar structure, it is possible to form on the support member the wiring to the first electrode that is installed on the support member. Also, it is possible to form the light absorption region on the expanded first electrode, and in addition to expanding the light absorbing surface area, it is also possible for the first electrode to exhibit a heat collecting path effect, doing heat collection of the heat generated at the peripheral edge of the light absorption region to the center at which the pyroelectric bodies exist.

(4) With one mode of the invention, the metal compound layer is formed covering a region of the first electrode not facing opposite the second electrode, an insulating layer covering the metal compound layer is further provided, and the wiring section is connected through the openings of the insulating layer and the openings of the metal compound layer.

In this way, it is possible to form the wiring section on the insulating layer. If there is no insulating layer, when doing pattern etching of the wiring section, the metal compound layer of the bottom layer is etched, and the barrier properties decrease. It is also preferable to form the insulating layer on the metal compound layer to ensure the metal compound layer barrier properties.

(5) With one mode of the invention, each of the plurality of pyroelectric capacitors includes a first electrode provided on the support member, and a second electrode facing opposite the first electrode via the pyroelectric body, and between the first electrodes of two pyroelectric capacitors that are serially connected in the direction that matches the polarization direction is made conductive. As a result, the wiring path is at its shortest, so there is less voltage drop and it is possible to suppress a decrease in output voltage.

(6) With one mode of the invention, it is possible to have the first electrodes of the two pyroelectric capacitors that are serially connected in the direction that matches the polarization direction be common electrodes. By doing this, since it is possible to omit the wiring section, it is possible to form the common electrode to be wider and thicker than the wiring section, so it is possible to dramatically reduce the wiring resistance. As a result, it is possible to have less drop in voltage and to suppress a decrease in output voltage.

(7) One mode of the invention further includes a first wiring section connected to both ends of a capacitor row consisting of the plurality of pyroelectric capacitors that are serially connected in the direction that matches the polarization direction, and a second wiring section connecting between the plurality of pyroelectric capacitors, and it is possible to have the width of the first wiring section be narrower than the width of the second wiring section.

By doing this, while suppressing heat dissipation by making the width of the first wiring section which is the heat exit smaller, it is possible to suppress a drop in voltage with the second wiring section being wider between the pyroelectric capacitors.

(8) A pyroelectric light detector of another mode of the invention relates to a pyroelectric light detector including
a base unit,
support members including a first surface and a second surface facing opposite the first surface, arranged via a hollow space section between the second surface and the base unit,
a plurality of pyroelectric capacitors supported by the support member and respectively containing pyroelectric bodies, and
a light absorbing layer provided in contact respectively with the plurality of pyroelectric capacitors,
wherein the plurality of pyroelectric capacitors are electrically connected,
the light absorbing layer consists of a plurality of light absorption regions corresponding to each of the plurality of pyroelectric capacitors, and
with a plan view from the base unit thickness direction, the center of gravity of each of the plurality of light absorption regions exists at a position overlapping the pyroelectric body of each one of the pyroelectric capacitors to which each of the plurality of light absorption regions corresponds.

With yet another mode of the invention, the light absorbed by each one of the light absorption regions is transmitted as heat to the pyroelectric bodies of each one of the pyroelectric capacitors. The pyroelectric body detects the size of the light volume (heat volume) by the spontaneous polarization volume being changed by the pyroelectric effect due to heat based on the light, and finding the volume of that change. At that time, the plurality of pyroelectric capacitors installed on one support member constitute a common pixel (one pixel), and at the same time, the light made incident on each one light absorption region has to be detected simultaneously by each one pyroelectric capacitor. With one mode of the invention, it is possible to match the heat transmission characteristics of the heat absorbed by each one of the light absorption regions being transmitted to the pyroelectric body of each one of the pyroelectric capacitors. Thus, for example, the peaks (mountains) of the generated electric charge on the time axis can be matched, making simultaneous detection possible by a plurality of pyroelectric capacitors, thus making it possible to increase the detection output of the pyroelectric light detector. In other words, the thermal time constant of the pyroelectric light detector is smaller, and for example, when outputting two dimensional image heat distribution based on the output of a plurality of pyroelectric light detectors, it is possible to display that image at a high frame rate.

Here, when arranging one light absorbing member on an area covering a plurality of pyroelectric capacitors, that one light absorbing member is divided, becoming one light absorption region corresponding to each of a plurality of pyroelectric capacitors. In addition to this, it is also possible to provide a plurality of light absorbing members on an area respectively covering a plurality of pyroelectric capacitors, and in this case, one light absorbing member becomes one light absorption region.

It is possible to serially connect a plurality (m, where n is an integer of 2 or greater) of pyroelectric capacitors on a support member in a direction matching the polarization direction. For example, with an individually arranged pyroelectric capacitor, and n pyroelectric capacitors of respectively the same electrode surface area serially connected, the combined resistance of the n pyroelectric capacitors is a magnitude of n times. Due to this effect, the output voltage can theoretically be made to be n times the output voltage of the pyroelectric type heat detecting element constituted by one pyroelectric element. However, one mode of the invention is not limited to necessarily having a plurality of pyroelectric capacitors serially connected on a support member, and it is also possible to individually retrieve signals from a plurality of pyroelectric capacitors.

(9) With the pyroelectric light detector of another mode of the invention, with the aforementioned plan view, it is possible for the center of gravity of each of the plurality of light absorption regions to have an overlap with the center of gravity of the pyroelectric body of each one of the pyroelectric capacitors to which each of the plurality of light absorption regions corresponds.

By doing this, the heat generated at each location within one light absorption region is collected evenly near the center of gravity of one light absorption region. That heat is effectively transmitted to the center of gravity of the pyroelectric body having overlap with the plan view with the center of gravity of one light absorption region. Thus, with each pyroelectric capacitor, using heat/electricity conversion, it is possible to generate almost the same electric charge without variation.

(10) With the pyroelectric light detector of another mode of the invention, it is possible for the pyroelectric body of each of the plurality of pyroelectric capacitors to have a contour which is an n (where n is an integer of 3 or greater) sided polygon, and include from a first contour line to an nth contour line, each of the contours of the plurality of light absorption regions corresponding to each of the plurality of pyroelectric capacitors to have an mth opposing contour line facing opposite the mth contour line of the pyroelectric body ($1 \leq m \leq n$), and the distance dm between the mth contour line and the mth opposing contour line to be fixed regardless of the value of m.

With this mode, the one light absorption region and one pyroelectric body become an n sided polygon of like shape. Thus, with one light absorption region, the distance from a first center of gravity to the mth opposing contour line is equal regardless of the value of m, and even with one pyroelectric body, the distance from the second center of gravity to the mth contour line is equal regardless of the value of m. As a result, it is possible to collect the heat generated within one light absorption region evenly on the pyroelectric bodies of one pyroelectric capacitor.

(11) With the pyroelectric light detector of another mode of the invention, it is possible for the contour of each of the pyroelectric bodies of the plurality of pyroelectric capacitors to be a circle or an oval.

From the perspective of stress relief on the support member, it is excellent to have a circle or oval for the contour of the pyroelectric bodies of the pyroelectric capacitor. The contour of the light absorption region can be a circle or oval, or rectangular, but the circle or oval are superior in terms of stress relief.

(12) With the pyroelectric light detector of another mode of the invention, it is possible for each of the plurality of pyroelectric capacitors to include a first electrode and a second electrode sandwiching the pyroelectric body, and to be a planar type capacitor for which the first electrode is supported by the support member, and the surface area of the first electrode with the aforementioned plan view is larger than the surface area of the second electrode.

By using a so-called planar structure, it is possible to form on the support member the wiring to the first electrode that is installed on the support member. It is also possible to form the light absorption region on the expanded first electrode, and in addition to the light absorption surface area being expanded, the first electrode also exhibits a heat collecting path effect, and it is possible to do heat collection of the heat generated at the peripheral edge of the light absorption region to the center at which the pyroelectric bodies exists.

(13) With another mode of the invention, it is possible to have each of the pyroelectric bodies of the plurality of pyroelectric capacitors have its side surface covered by an electrically insulating metal compound layer. The pyroelectric body is an oxide, and when this is deoxidized, oxygen loss occurs. The metal compound layer has deoxidizing gas barrier properties, so it is possible to suppress deoxidation of the pyroelectric body. In this way, it is possible to suppress oxygen loss of the pyroelectric body, so it is possible to make the pyroelectric capacitors more compact, and to install a plurality of pyroelectric capacitors on a single support member.

(14) With another mode of the invention, it is possible to have the light absorbing layer consist of a plurality of light absorbing layers formed divided corresponding to each of the plurality of pyroelectric capacitors.

Because the light absorbing layer is individualized, the heat from each individual absorption layer escapes from the periphery, and thus, it is possible to speed up the reset time for each individual pyroelectric capacitor. When one light absorbing layer is divided for each region to make individual light absorption regions, compared to when the light absorbing layer is individualized, it is possible to increase the light absorbing layer surface area, and there is the advantage of being able to omit the manufacturing process for division.

(15) With another mode of the invention, it is possible for the support member to have through holes at the region between two adjacent pyroelectric capacitors among the plurality of pyroelectric capacitors.

Here, when forming the support member, the plurality of pyroelectric capacitors and the like on the base unit, a sacrifice layer is embedded in the hollow space section. After the support member, the plurality of pyroelectric capacitors and the like are formed on the base unit, this sacrifice layer is removed by isotropic etching using an etchant. During this etching, the through holes are used as supply ports for the etchant. By doing this, it is easier for the etchant to wrap around the lower sacrifice layer of the support member, making it easier to remove the sacrifice layer using isotropic etching.

(16) Yet another mode of the invention defines the pyroelectric light detecting device as the pyroelectric light detectors described above being arranged two-dimensionally along two intersecting straight line directions.

As a result, a pyroelectric light detecting device (pyroelectric light array sensor) is realized for which a plurality of pyroelectric light detectors (pyroelectric light detecting elements) are arranged two dimensionally (e.g. arranged in array form along each of two orthogonal axes).

(19) Yet another mode of the invention defines an electronic device having the previously described pyroelectric light detector or the pyroelectric light detecting device.

Both of the pyroelectric light detectors noted above have high light detection sensitivity. Thus, the performance is increased for electronic devices in which this pyroelectric light detector is installed. Examples of electronic devices include infrared sensor devices, thermographic devices, in-vehicle night cameras, surveillance cameras and the like.

Following, we will give a detailed description of preferred embodiments of the invention. The embodiments described hereafter do not unduly restrict the contents of the invention noted in the claims, and all of the structures described with the embodiments are not necessarily essential as the resolution means of the invention.

Figure 1B:
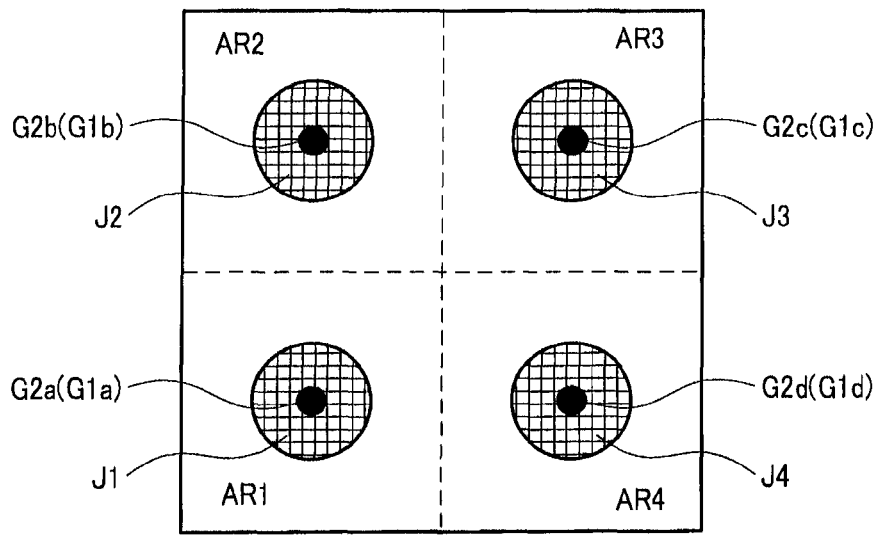

1. First Embodiment 1.1 Arrangement of the Plurality of Light Absorption Regions and the Plurality of Capacitors FIG. 1A and FIG. 1B are concept drawings of the pyroelectric light detector of the first embodiment of the invention. As shown in FIG. 1A, a plurality of, for example 4, pyroelectric capacitors (also called capacitors) Capa1 to Capa4 are installed on the support member (membrane) 30. Each of the capacitors Capa1 to Capa4 on the support member 30 have a pyroelectric body between two electrodes. Also, each of the capacitors Capa1 to Capa4 on the support member 30 is arranged inside a light absorbing layer 50 having a plurality of light absorption regions AR1 to AR4 of substantially equal surface area, for example. The light absorbing layer 50 can be formed divided into a plurality of light absorption regions AR1 to AR4, or can be formed as an integrated unit.

FIG. 1B shows first centers of gravity G1a to G1d for which each of the centers of gravity of the light absorption regions AR1 to AR4 are projected on a two dimensional surface with a plan view, regions J1 to J4 for which the contour lines of the pyroelectric bodies of the pyroelectric capacitors Capa1 to Capa4 are projected on a two dimensional surface, and second centers of gravity G1a to G2d for which the centers of gravity of the pyroelectric bodies of the pyroelectric capacitors Capa1 to Capa4 are projected on a two dimensional surface.

As is clear from FIG. 1B, each one of the first centers of gravity G1a to G1d exists inside each one of regions J1 to J4 for which the contour lines of the pyroelectric bodies are projected on a two dimensional surface.

Here, the light absorbed with each of the light absorption regions AR1 to AR4 is transmitted as heat to the pyroelectric bodies of each of the pyroelectric capacitors Capa1 to Capa4. The pyroelectric bodies change the volume of spontaneous polarization using the pyroelectric effect by heat based on the light, and detect the size of the light volume (heat volume) by finding the volume of that change. When doing that, the plurality of pyroelectric capacitors Capa1 to Capa4 installed on one support member 30 constitute a common pixel (one pixel), so the light made incident simultaneously on each of the light absorption regions AR1 to AR4 must be detected simultaneously by each of the pyroelectric capacitors Capa1 to Capa4. With this embodiment, the heat absorbed by each of the light absorption regions AR1 to AR4 is transmitted to the pyroelectric bodies of each of the pyroelectric capacitors Capa1 to Capa4 and the heat transmission characteristics can be matched. Thus, for example, it is possible to do time based matching of the peaks (mountains) of generated electrical charges, and to simultaneously do detection at each of the plurality of pyroelectric capacitors Capa1 to Capa4.

In FIG. 1B, specifically, each of the first centers of gravity G1a to G1d and each of the second centers of gravity G2a to G2d have overlap. Working in this way, heat that is generated at each location within the light absorption regions AR1 to AR4 is collected evenly near each one of the first centers of gravity G1a to G1d. That heat is effectively transmitted to pyroelectric bodies held by each of the second centers of gravity G2a to G2d which overlap on a two dimensional projecting surface of each of the first centers of gravity G1a to G1d. Thus, with each of the pyroelectric capacitors Capa1 to Capa4, it is possible to generate electric charges in almost the same way with little variation, using thermoelectric conversion. However, the first centers of gravity G1a to G1d and the second centers of gravity G2a to G2d are not restricted to having overlap. It is satisfactory if at least each one of the first centers of gravity G1a to G1d exists inside each one of the regions J1 to J4 for which the contour lines of the pyroelectric bodies are projected on a two dimensional surface.

When one light absorbing member is arranged in the region covering the plurality of pyroelectric capacitors Capa1 to Capa4, this one light absorption member is divided, becoming single light absorption regions AR1 to AR4 corresponding to each of the plurality of pyroelectric capacitors Capa1 to Capa4. In addition to this, it is also possible to provide a plurality of light absorbing members in the regions respectively covering the plurality of pyroelectric capacitors, and in this case, one light absorbing member becomes one light absorption region.

1.2 Serial Connection of the Plurality of Capacitors

With the example of FIG. 1A, first capacitor Capa1 to fourth capacitor Capa4 are serially connected on the support member 30. However, the first capacitor Capa1 to the fourth capacitor Capa4 are not required to be serially connected on the support member 30, but can also be serially connected outside the support member 30, for example.

The pluses and minuses in FIG. 1A indicate the polarization polarity of each of the capacitors Capa1 to Capa4. With this example, the capacitance value of each of the capacitors Capa1 to Capa4 is the same, but the invention is not limited to this. The positive pole of the first capacitor Capa1 is connected to a first outside terminal TA1, and this first outside terminal TA1 has positive polarity. Also, the negative pole of the fourth capacitor Capa4 is connected to a second outside terminal TA2, and this second outside terminal TA2 has negative polarity.

Figure 2A:
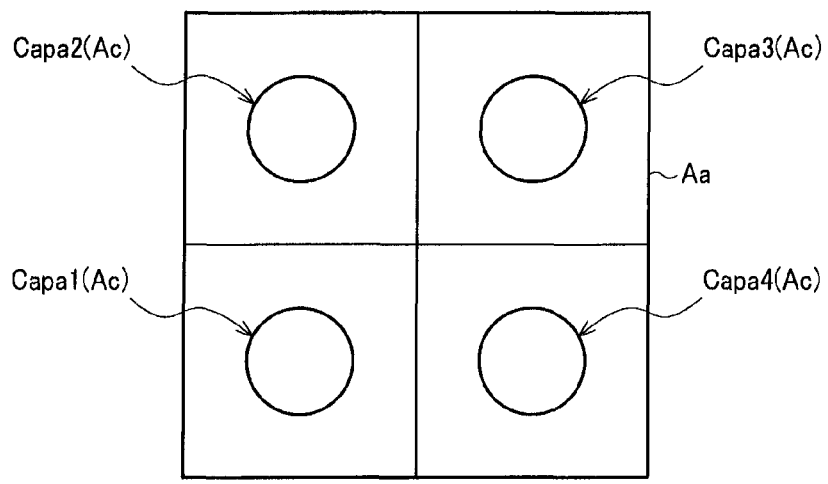
FIG. 2A is a drawing that shows the light absorption region surface area and element surface area of the first embodiment, 2B shows the light absorption region surface area and element surface area of a first comparison example, and 2C shows the light absorption region surface area and element surface area of comparison example 2.
Figure 2B:
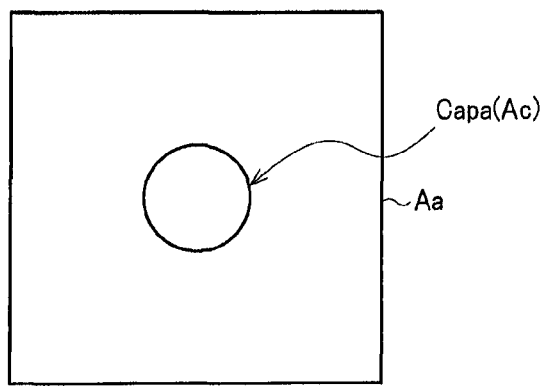
Figure 2C:
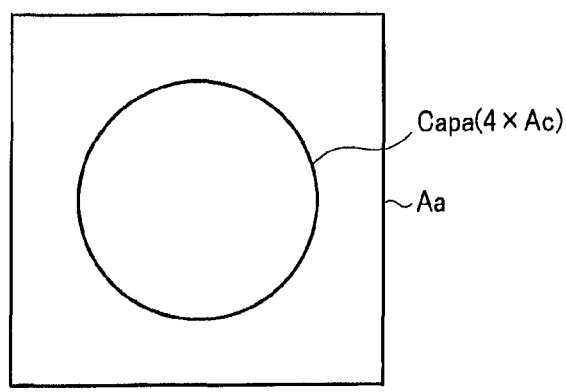

Here, FIG. 2A shows a schematic plan view of this embodiment, FIG. 2B shows a schematic plan view of comparison example 1, and FIG. 2C shows a schematic plan view of comparison example 2. The light receiving section surface areas (surface area of the light absorption region) Aa shown in FIG. 2A to FIG. 2C are respectively equal.

First, we will compare this embodiment shown in FIG. 2A and comparison example 1 shown in FIG. 2B. Each of the capacitors Capa1 to Capa4 shown in FIG. 2A and the individual Capa shown in FIG. 2B respectively have an equal element surface area Ac and capacitance C.

With FIG. 2A and FIG. 2B, when the capacitor element resistance is Rp (combined resistance in the case of FIG. 2A), the output voltage from the capacitors obtained by converting heat of the radiated light to a charge Q is as follows:

$$Vs = Q \times Rp \quad (1)$$

In other words, the output voltage Vs of the pyroelectric light detector varies according to the product of the capacitor polarity charge Q and the capacitor resistance value Rp. Also, since the charge Q is proportional to the light receiving section surface area Aa and the element surface area Ac, the following expression is established.

$$Vs \propto Aa \cdot Ac \cdot Rp \quad (2)$$

However, in FIG. 2A, since the capacitors Capa1 to Capa4 are serially connected in a direction that matches the polarization direction, the element surface areas Ac of the capacitors Capa1 to Capa4 have an equal relationship electrically with a single capacitor Capa element surface area Ac as shown in FIG. 2B. Also, the light receiving section surface area (light absorption region surface area) Aa of FIG. 2A and the light receiving section surface area (light absorption region surface area) Aa of FIG. 2B are equal as described above.

In light of this, next we will consider the capacitor element resistance for Rp. In FIG. 2B, from the relationship of the element resistance Rp and the capacity, the following expression is established.

$$Rp = 1/C \quad (3)$$

Meanwhile, in FIG. 2A, when the capacitance value of each of the capacitors Capa1 to Capa4 is C, the combined capacitance value of the serially connected combined capacitors Capa is C/4. When the combined element resistance is Rpx, the following expression is established.

$$Rpx = 4/C = 4 \times Rp \quad (4)$$

Thus, referring to expression (1), we can see that the output voltage Vs obtained with this embodiment shown in FIG. 2A is 4 times the output voltage obtained with comparison example 1 shown in FIG. 2B. In other words, by serially connecting n capacitors, compared to the case of the single capacitor in comparison example 1, the combined capacitance determined by the electrical electrode surface (electrical capacitor capacitance) is 1/n, and as a result of that, the combined resistance becomes a magnitude of n times, and we can see that as a result, the output voltage Vs becomes a magnitude of n times.

Next, we will compare this embodiment shown in FIG. 2A and the comparison example 2 shown in FIG. 2C. The total element surface area of the capacitors Capa1 to Capa4 shown in FIG. 2A (4×AC) and the element surface area of the single Capa shown in FIG. 2C (4×AC) are equal.

Compared to the electrical element surface area Ac of the four serially connected units shown in FIG. 2A, the element surface area of comparison example 2 is 4×Ac. Meanwhile, in FIG. 2A, when the capacitance value of each of the capacitors Capa1 to Capa4 is C, the combined capacitance value of the serially connected combined capacitors Capa is C/4, and as shown in expression (4), the resistance value is 4×Rp. In contrast to this, the capacitance value of the single capacitor Capa in FIG. 2C is 4×C, and the resistance value of the single capacitor Capa in FIG. 2C is Rp/4. Because of this, though the element surface area (4×Ac) in FIG. 2C is a magnitude of 4 times, the resistance value (Rp/4) is a magnitude of ¼ times, so the element surface area is offset by the resistance value. Thus, the output voltage Vs of FIG. 2C is equal to FIG. 2B, and the output voltage Vs of FIG. 2A is ¼. Therefore, it is possible to ensure that the output voltage Vs obtained with this embodiment shown in FIG. 2A is greater than that of comparison examples 1 and 2 in FIG. 2B and FIG. 2C.

Figure 3:
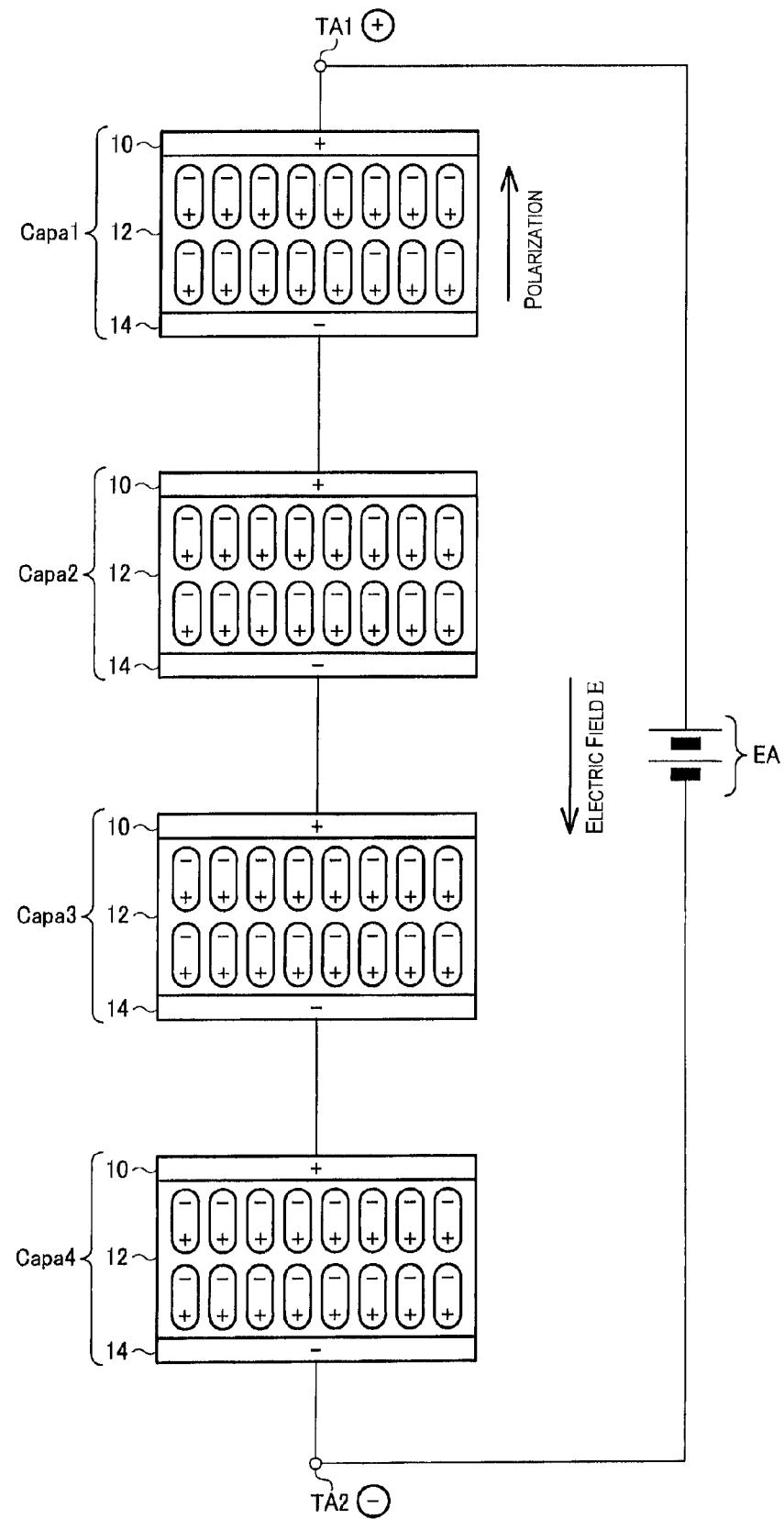
FIG. 3 is a drawing showing the bias application state of serially connected capacitors of the first embodiment.

1.3 Bias Voltage that Causes Spontaneous Polarization of a Plurality of Pyroelectric Capacitors FIG. 3 shows spontaneous polarization when bias is applied to the capacitors Capa1 to Capa4 shown in FIG. 1. Each of the capacitors Capa1 to Capa4 has a pyroelectric body 12 such as a PZT or the like between the first electrode 10 and the second electrode 14. The plus terminal of the power source EA is connected to the outer terminal TA1, and the minus terminal is connected to the outer terminal TA2, and when an electric field E shown in FIG. 3 acts on the capacitors Capa1 to Capa4, the polarization direction of the capacitors Capa1 to Capa4 can be matched.

In other words, with each of the Capa1 to Capa4, the electric field E acts on the first electrode 10, the pyroelectric body 12, and the second electrode 14. Because of that, with each of the Capa1 to Capa4, with the example in FIG. 3, polarization is done by matching the polarization direction such that the first electrode 10 side goes to plus and the second electrode 14 side goes to minus. After that, even when the electric field E is canceled, spontaneous polarization is maintained with the pyroelectric bodies 12 of each of the Capa1 to Capa4.

Here, as shown in FIG. 3, with each of the Capa1 to Capa4, there is a floating electric charge on the exposed surface of the first electrode 10 and the second electrode 14. With the example in FIG. 3, the floating electric charge of the first electrode 10 is matched to minus, and the floating electric charge of the second electrode 14 is matched to plus, but the invention is not limited to this. For example, it is also possible to select various combinations such as connecting the first capacitor Capa1 first electrode 10 and the second capacitor Capa2 first electrode 10, connecting the electrodes of adjacent capacitors among Capa1 to Capa4, having the first and second electrodes 10 and 14 together, the first electrodes 10 together, the second electrodes 14 together or the like. Similarly, for the outer terminal TA2 as well, it is possible to connect to any one of the first and second electrodes 10 and 14 of the fourth capacitor Capa4.

The principle of light detection using pyroelectric capacitors is to detect the size of the light volume (heat volume) by changing the spontaneous polarization volume of the pyroelectric capacitor after canceling the electric field E and finding that change volume using the pyroelectric effect using heat based on light. Thus, it is acceptable to generate a polarized state using the action of the electric field E on the Capa1 to Capa4 at least during manufacturing before light detection or at least one time during use or the like.

1.4 Structure of the Pyroelectric Light Detector

Figure 4:
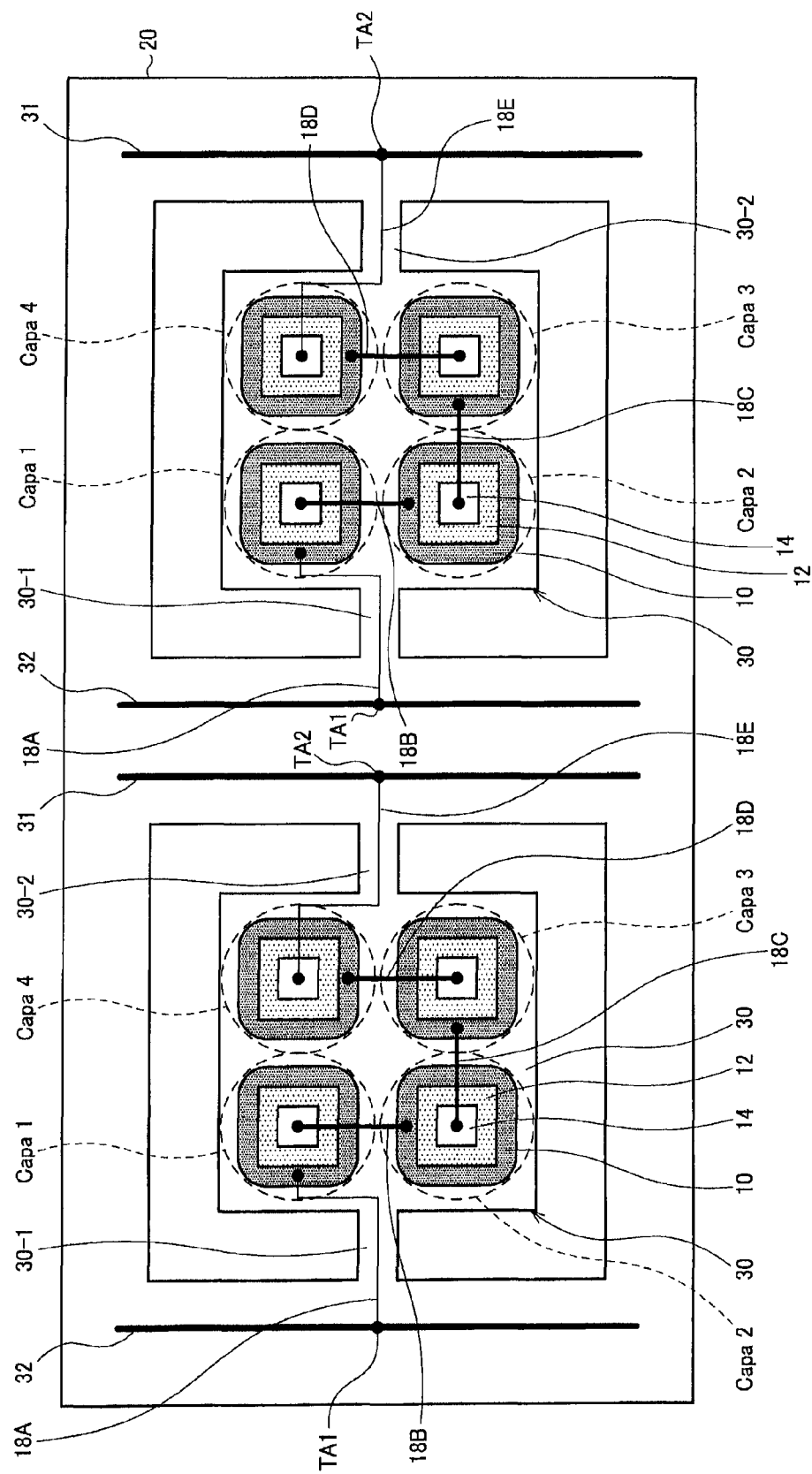
FIG. 4 is a schematic plan view of a pyroelectric light detector of the first embodiment having four capacitors in series.
Figure 5:
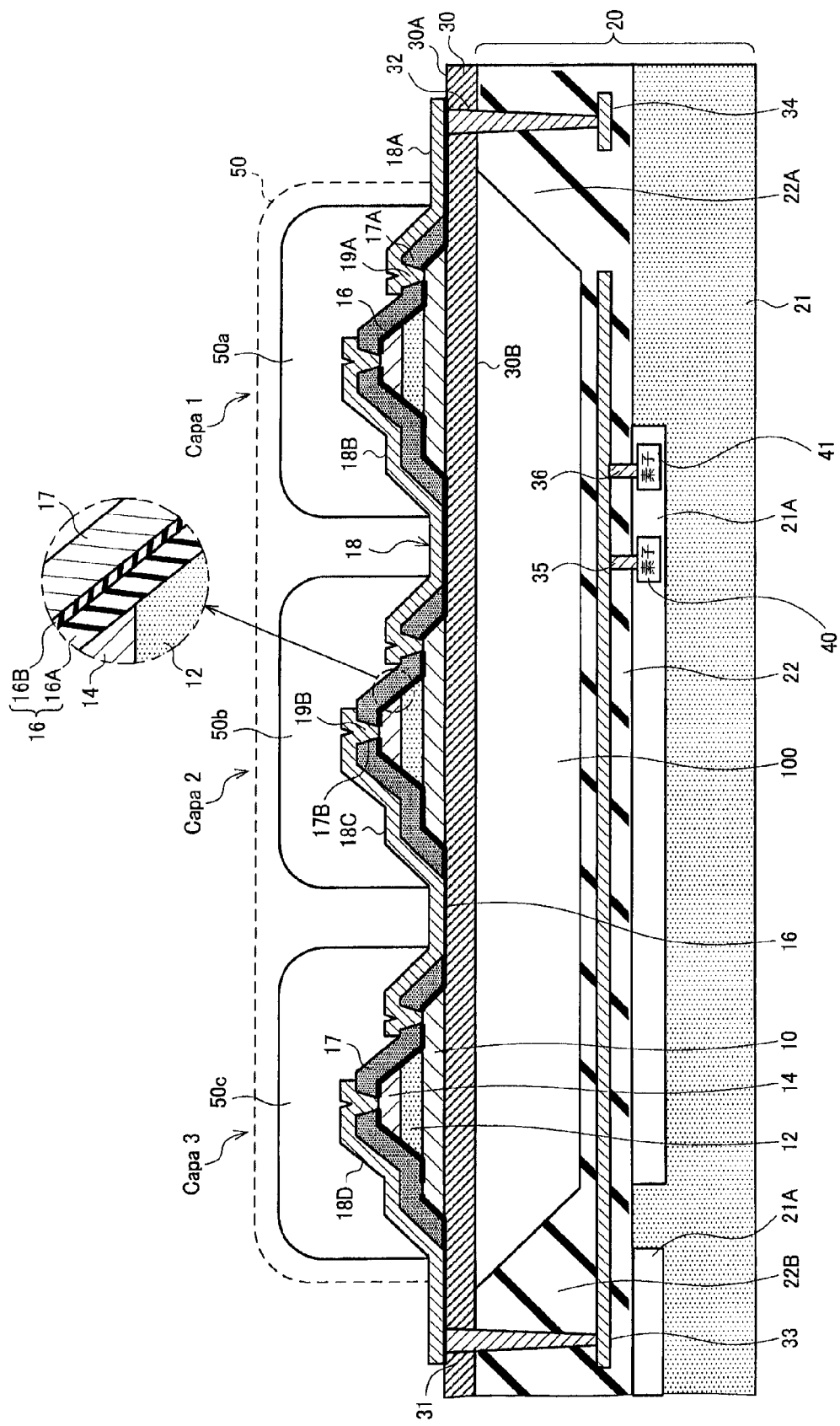
FIG. 5 is a schematic cross section diagram of a pyroelectric light detector of the first embodiment having three capacitors in series.

FIG. 4 and FIG. 5 are a plan view and cross section view of a pyroelectric light detector, for example the pyroelectric type infrared detector 200. In FIG. 4, the same as in FIG. 1, four pyroelectric capacitors are serially connected, but in FIG. 3, because of space related issues, a state with three pyroelectric capacitors serially connected is shown. This pyroelectric type infrared detector 200 has a base unit 20, a support member (membrane) 30 provided on the base unit 20, and a plurality of (four in FIG. 4, and three in FIG. 5) pyroelectric capacitors Capa1 to Capa4 (Capa1 to Capa3) serially connected on the support member (membrane) 30. The plurality of pyroelectric capacitors are generally referred to as Capa.

As shown in FIG. 4, the support member (membrane) 30 is equipped with two arms 30-1 and 30-2, and the two arms 30-1 and 30-2 are supported on the base unit 20. As shown in FIG. 5, the support member (membrane) 30 includes a first surface 30A, and a second surface 30B facing opposite a first surface 30A, and a hollow space section 100 is formed between the second surface 30B and the base unit 20. This hollow space section 100 provides heat separation of the support member (membrane) 30 and the base unit 20.

As shown in FIG. 5, the base unit 20 has, for example, a silicon substrate 21, and an insulating film ($SiO_2$ layer) 22 formed on the silicon substrate 21, and the hollow space section 100 is formed by removing part of the insulating film 22. It is possible to form elements 40 and 41 such as transistors on the element region 21A of the silicon substrate 21.

The regions other than the hollow space section 100 of the insulating layer 22 shown in FIG. 5 become the holding parts (posts) 22A and 22B for holding at least two locations of the support member 30. Vias 31 and 32 can be provided on these holding parts 22A and 22B. The via 31 is connected to a wiring layer 33 provided in the insulating layer 22. The via 32 is connected to another wiring layer 34 provided in the insulating layer 22. The wiring layer 33 can further be connected to elements 40 and 41 via contacts 35 and 36 provided in the insulating layer 22.

Each of the plurality of pyroelectric capacitors Capa has a first electrode (lower electrode) 10 on the support member (membrane) 30 side, a second electrode (upper electrode) 14 provided on the side opposite to the support member (membrane) 30 side and for which the surface area with the plan view is smaller than that of the first electrode 10, and a pyroelectric body (e.g. PZT layer: lead zirconate titanate layer) 12 provided between the first electrode 10 and the second electrode 14.

As shown in FIG. 5, each of the plurality of pyroelectric capacitors Capa is covered by a metal compound layer 16 having insulating properties such as aluminum oxide. This metal compound layer 16 functions as a deoxidizing gas barrier membrane. As a result, with each of the plurality of pyroelectric capacitors Capa, there is suppression of infiltration to the capacitor by deoxidizing gases (hydrogen, steam, OH group, methyl group or the like) with the steps after the capacitors are formed. This is because the pyroelectric body 12 is an oxide, and when an oxide is deoxidized, oxygen loss occurs, and pyroelectric effect is lost. In this way, oxygen loss of the pyroelectric body 12 is prevented by the metal compound layer 16, so at each of the plurality of light absorption regions on one support member 30, it is possible to form a plurality of pyroelectric capacitors Capa each of which is relatively small in size.

The metal compound layer 16, as shown enlarged in FIG. 5, is able to include a first barrier layer (first layer membrane)

16A and a second barrier layer (second layer membrane) 16B. The first barrier layer 16A can be formed by doing film formation of a metal oxide, for example, aluminum oxide $Al_2O_3$ using a sputtering method. Deoxidizing gas is not used with the sputtering method, so the capacitor 230 is not deoxidized. The second barrier layer 16B can be by doing film formation of for example aluminum oxide $Al_2O_3$, using an atomic layer chemical vapor deposition (ALCVD) method, for example. The normal chemical vapor deposition (CVD) method uses deoxidizing gas, but the capacitors Capa are isolated from the deoxidizing gas by the first layer barrier layer 16A.

Here, the total film thickness of the metal compound layer 16 is from 50 to 70 nm, for example 60 nm. At this time, the film thickness of the first barrier layer 16A formed using the CVD method is thicker than the second barrier layer 16B formed using the atomic layer chemical vapor deposition (ALCVD) method, and is from 35 to 65 nm, for example 40 nm. In contrast to this, it is possible to make the film thickness of the second barrier layer 16B formed using the atomic layer chemical vapor deposition (ALCVD) method thinner, and for example it is possible to form the aluminum oxide $Al_2O_3$ with film formation at 5 to 30 nm, for example 20 nm. Compared to the sputtering method, the atomic layer chemical vapor deposition (ALCVD) method has excellent embedding characteristics, so it is possible to accommodate miniaturization, and it is possible to increase the deoxidation gas barrier properties for the first and second barrier layers 16A and 16B. Also, the first barrier layer 16A for which film formation is done using the sputtering method is not precise compared to the second barrier layer 16B, and that has an effect that lowers the heat transfer rate, so by interposing the first barrier layer 16A with low thermal conductivity between the pyroelectric capacitor Capa and the second barrier layer 16B, it is possible to prevent dissipation of heat from the pyroelectric capacitor Capa.

As shown in FIG. 5, an interlayer insulating film 17 is formed on the metal compound layer 16. Generally, when there is a chemical reaction of the raw material gas (TEOS) of the interlayer insulation film 17, a deoxidization gas such as hydrogen gas or vapor or the like is generated. The first deoxidizing gas barrier membrane 16 provided in the periphery of the capacitors Capa protects the capacitors Capa from deoxidizing gas generated during the formation of this interlayer insulating film 17.

As shown in FIG. 5, a wiring layer 18 is arranged on the interlayer insulating film 17. A first contact hole 17A and second contact hole 17B are formed on the interlayer insulating film 17 before formation of the electrode wiring. At that time, a contact hole is similarly formed on the metal compound layer 16. The first electrode (lower electrode) 10 and the wiring layer 18 are made conductive by a first plug 19A embedded in the first contact hole 17A Similarly, the second electrode (upper electrode) 14 and the wiring layer 18 are made conductive by a second plug 19B embedded in the second contact hole 17B.

With this embodiment, as shown in FIG. 5, the via 32 and the lower electrode 10 of the Capa1 are formed by the wiring layer 18A, the upper electrode 14 of the Capa1 and the lower electrode 10 of the Capa2 are formed by the wiring layer 18B, the upper electrode 14 of the Capa2 and the lower electrode 10 of the Capa3 are formed by the wiring layer 18C, and the upper electrode 14 of the Capa3 and the via 31 are formed by the wiring layer 18D. In FIG. 4, working in a similar manner, the four pyroelectric capacitors Capa1 to Capa4 are serially connected in a direction matching the polarization direction using wiring 18A to 18E.

The width of both ends of the capacitor line consisting of a plurality of serially connected pyroelectric capacitors and of the first wiring section connected to the outer terminals TA1 and TA2 (in FIG. 4, wiring 18A and 18E, and in FIG. 5, 18A and 18D) can be made narrower than the width of the second wiring section (in FIG. 4, wiring 18B to 18D, and in FIG. 5, 18B to 18C) connecting between the plurality of pyroelectric capacitors.

By doing that, it is possible for the width of the first wiring section that is a heat exit (in FIG. 4, wiring 18A and 18E, and in FIG. 5, 18A and 18D) to be made narrow to suppress heat dissipation, while the width of the second wiring section between the pyroelectric capacitors (in FIG. 4, wiring 18B to 18D, and in FIG. 5, 18B to 18C) is made wider to suppress a drop in voltage.

Here, when there is no interlayer insulating film 17, when doing pattern etching of the wiring layer 18, the metal compound layer 16 of the lower layer (second barrier layer 16B) is etched, and the barrier properties decrease. It is also preferable to form the interlayer insulating film 17 on the metal compound layer 16 to ensure the barrier properties of the metal compound layer 16.

Also, it is preferable that the moisture content of the interlayer insulating film 17 be low, or that the hydrogen content be low. In light of this, the interlayer insulating film 17 undergoes degassing processing by annealing. In this way, the hydrogen content or moisture content of the interlayer insulating film 17 is made to be lower than that of the light absorbing layer 50 that covers the wiring layer 18 or the posts (holding parts) 22A and 22B that are insulating film. In this way, even if the capacitors Capa are exposed to high temperatures after the interlayer insulating film 17 is formed, it is possible to suppress the generation of deoxidizing gas from the interlayer insulating film 17.

Figure 6A:
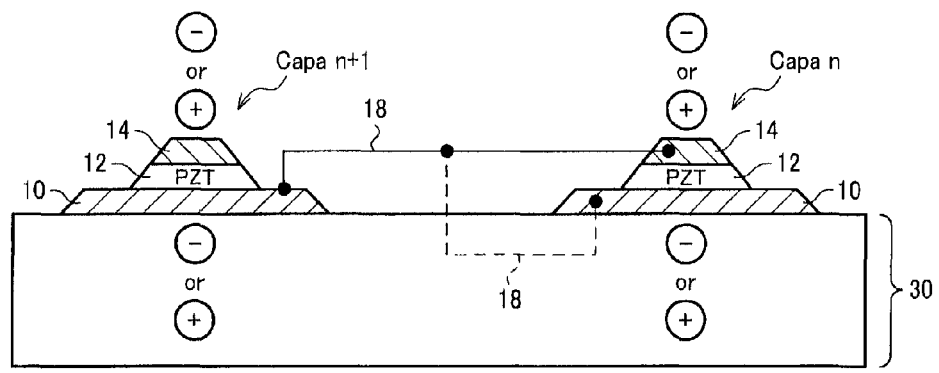
FIGS. 6A and 6B are drawings showing an example of the connection wiring of two pyroelectric capacitors.
Figure 6B:
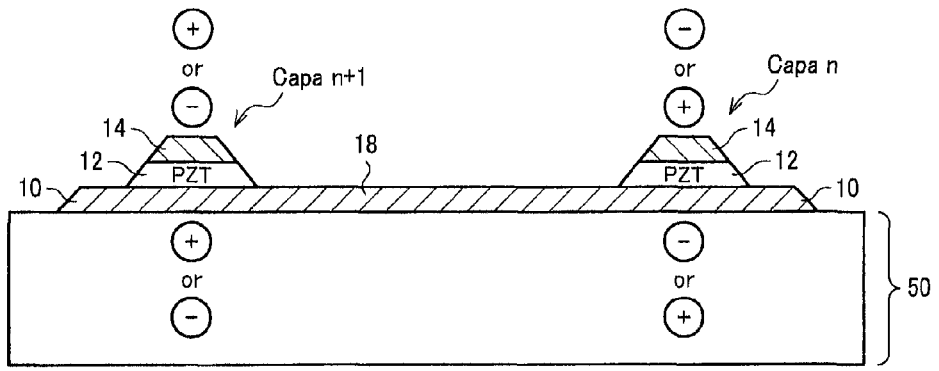

FIG. 6A and FIG. 6B show wiring examples of two Capan and Capan+1 serially connected in a direction that matches the polarization direction. As shown in FIG. 6A, this is not limited to a connection by the wiring layer 18 between the upper electrode 14 of Capan and the lower electrode 10 of Capan+1, but can also be a connection by the wiring layer 18 between the lower electrodes 10 of the Capan and Capan+1. In this way, it is possible to connect between two Capan and Capan+1, and since it is not necessary to form the wiring 18 connecting the lower electrodes 10 along mountain shaped capacitors, the wiring 18 is in the shortest path. As a result, there is less voltage drop, and the decrease in output voltage Vs is suppressed.

Alternatively, as shown in FIG. 6B, it is possible to omit the wiring layer 18 with the lower electrode 10 of Capan and Capan+1 as a common electrode. By doing this, since it is possible to omit the wiring 18, it is possible to from the common electrode to be broader and thicker than the wiring 18, so it is possible to dramatically reduce the wiring resistance. As a result, the voltage drop is smaller and it is possible to further suppress the decrease in output voltage Vs.

In the case of both FIG. 6A and FIG. 6B, if the bias electric field E is operated by doing as shown in FIG. 3, the polarization direction of Capan and Capan+1 is definitively determined.

The light absorbing layer 50 is formed as shown in FIG. 5 on the pyroelectric capacitors Capa connected by wiring. When one light absorbing layer 50 is arranged covering the plurality of pyroelectric capacitors Capa1 to Capa3 shown in FIG. 5, the regions with almost equal surface areas corresponding to the plurality of pyroelectric capacitors Capa1 to Capa3 become their individual light absorption regions. It is also possible to form a plurality of divided light absorbing layers 50a to 50c covering the plurality of pyroelectric capacitors Capa1 to Capa3 shown in FIG. 5. As a result, compared to when there is one common light absorbing layer 50, the heat dissipating speed of the individual pyroelectric capacitors Capa1 to Capa3 becomes faster, and there is the advantage of being able to perform thermal reset in a short time.

Figure 7:
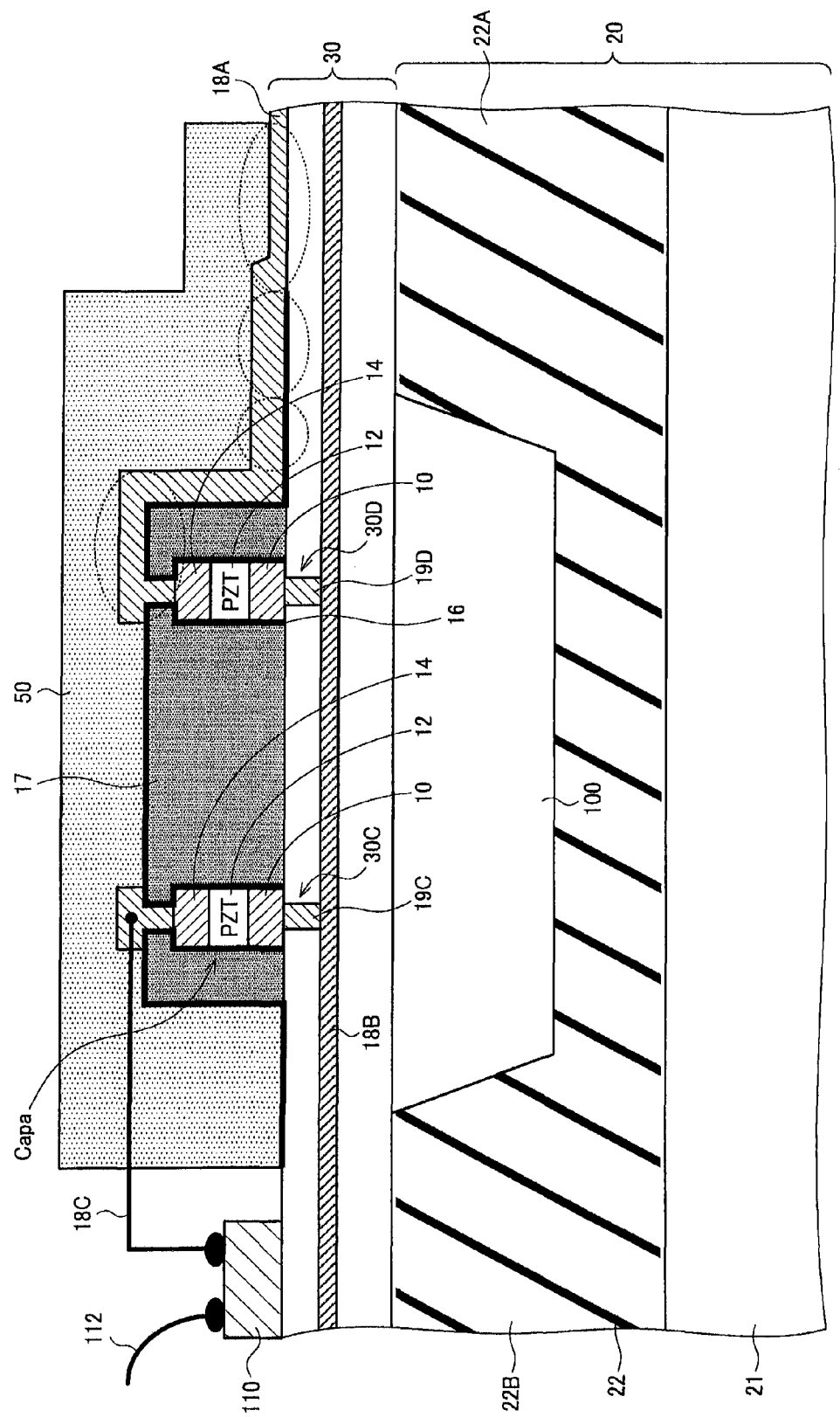
FIG. 7 is a cross section diagram showing an embodiment for which the invention is applied to a pyroelectric light detector having a stack type pyroelectric capacitor.

With the embodiment described above, the lower electrode 10 had a wider planar structure than the upper electrode 14, but it is also possible to apply the invention to a stack structure pyroelectric capacitor Capa as shown in FIG. 7. With the stack structure pyroelectric capacitor Capa, as shown in FIG. 7, the horizontal cross section surface areas of the first electrode 10, the pyroelectric body 12, and the second electrode 14 are substantially equal. Thus, in contrast to the planar structure pyroelectric capacitor, it is not possible to provide the wiring to the first electrode 10 above the interlayer insulating layer 17.

Because of this, the support member (membrane) 30 is a multi-layer structure, and one of those layers is wiring 18B. This wiring 18B connects together first electrodes (lower electrodes) 10 of two adjacent pyroelectric capacitors Capa. The wiring 18B in the support member 30 is connected to the first electrodes (lower electrodes) 10 of two pyroelectric capacitors Capa by plugs 19C and 19D filling contact holes 30C and 30D formed on the support member 30.

Figure 8:
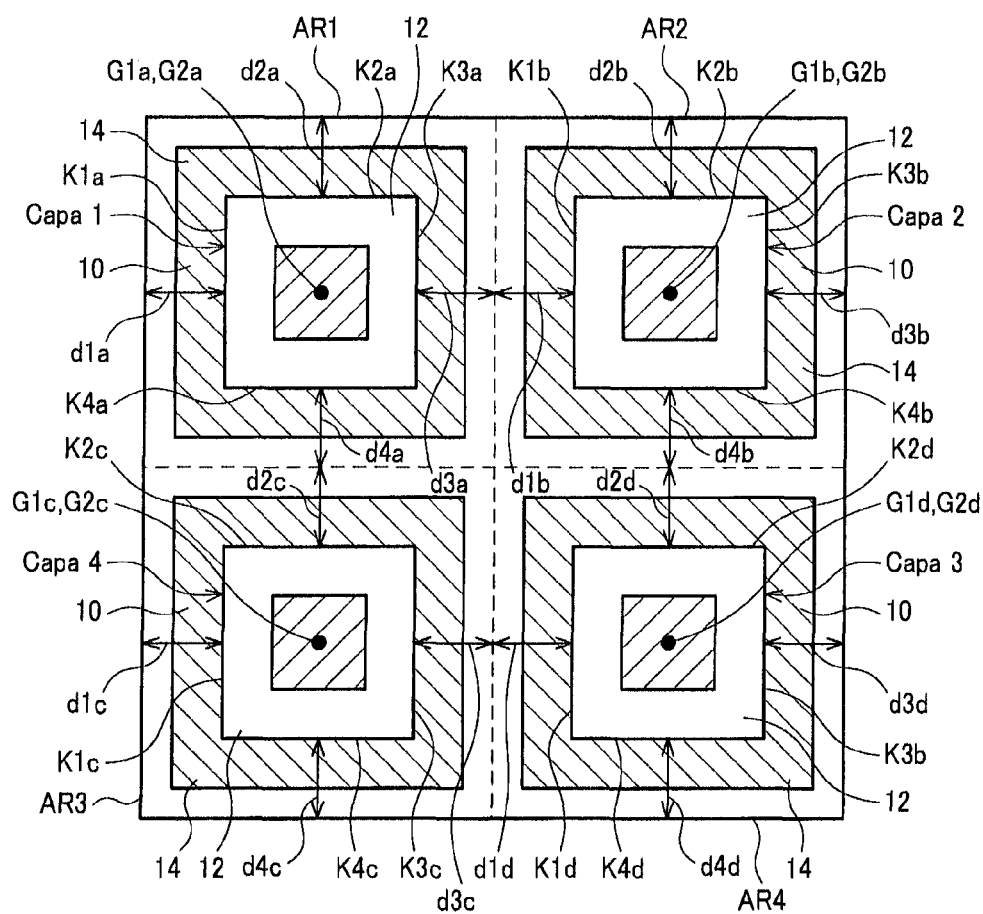
FIG. 8 is a drawing for describing the relationship of the contour lines of a plurality of light absorption regions and the contour of the pyroelectric bodies of each of the plurality of pyroelectric capacitors.

1.5 Relationship of the Light Absorption Regions and Pyroelectric Body Contour Lines Next, we will examine the relationship of the light absorption regions AR1 to AR4 and the pyroelectric body 12 contour lines. FIG. 8 shows an example in which each of the pyroelectric bodies 12 of the plurality of pyroelectric capacitors Capa1 to Capa4 have a contour of an n sided polygon (where n is an integer of 3 or greater), for example a quadrangle. The pyroelectric body 12 of the first pyroelectric capacitor Capa1 includes first through nth contour lines K1a to K4a. The light absorption region AR1 corresponding to the first pyroelectric capacitor Capa1 has an mth opposite facing contour line facing opposite the mth contour line ($1 < m \leq n$) of the pyroelectric body 12 of the first pyroelectric capacitor Capa2, and distance dm between the mth contour line and the mth opposite facing contour line (d1a, d2a, d3a, d4a) can be constant regardless of the value of m (d1a=d2a=d3a=d4a). The contour of each of the pyroelectric bodies 12 of the other capacitors Capa2 to Capa4 is also an n sided shape (where n is an integer of 3 or greater), for example a quadrangle, and includes first through nth contour lines K1b to K4b, K1c to K4c, and K1d to K4d. Then, similarly, the distance dm between the mth contour line and the mth opposite facing contour line can be made constant regardless of the value of m (d1b=d2b=d3b=d4b, d1c=d2c=d3c=d4c, d1d=d2d=d3d=d4d).

In this way, each one of the light absorption regions AR1 to AR4 and each of the pyroelectric bodies 12 of the plurality of pyroelectric capacitors Capa1 to Capa4 have an n sided polygon of a like shape. Thus, with one light absorption region, the distance from one center of gravity (G1a to G1d) to the mth opposite facing contour line is equal regardless of the value of m, and with each of the pyroelectric bodies 12 of the plurality of pyroelectric capacitors Capa1 to Capa4 as well, the distance from the second center of gravity (G2a to G2d) to the mth contour line is equal regardless of the value of m. As a result, the heat generated by each of the light absorption regions AR1 to AR4 can be collected evenly in the pyroelectric bodies 12 of one pyroelectric capacitor Capa.

With FIG. 2, the contour of each of the pyroelectric bodies 12 of the plurality of pyroelectric capacitors Capa1 to Capa4 is a circle, and when the contour of the pyroelectric body 12 is a circle or oval, in FIG. 2, the distance from the contour of the pyroelectric body 12 to the contour of the light absorption region AR1 to AR4 differs depending on the position. Thus, in terms of heat transfer uniformity, that in FIG. 8 is superior, but since the different in distance described above is relatively small even when the contour of the pyroelectric body 12 is a circle or oval, it is possible to exhibit the effects described with FIG. 2.

1.6 Through Holes Formed on the Support Member

Figure 9A:
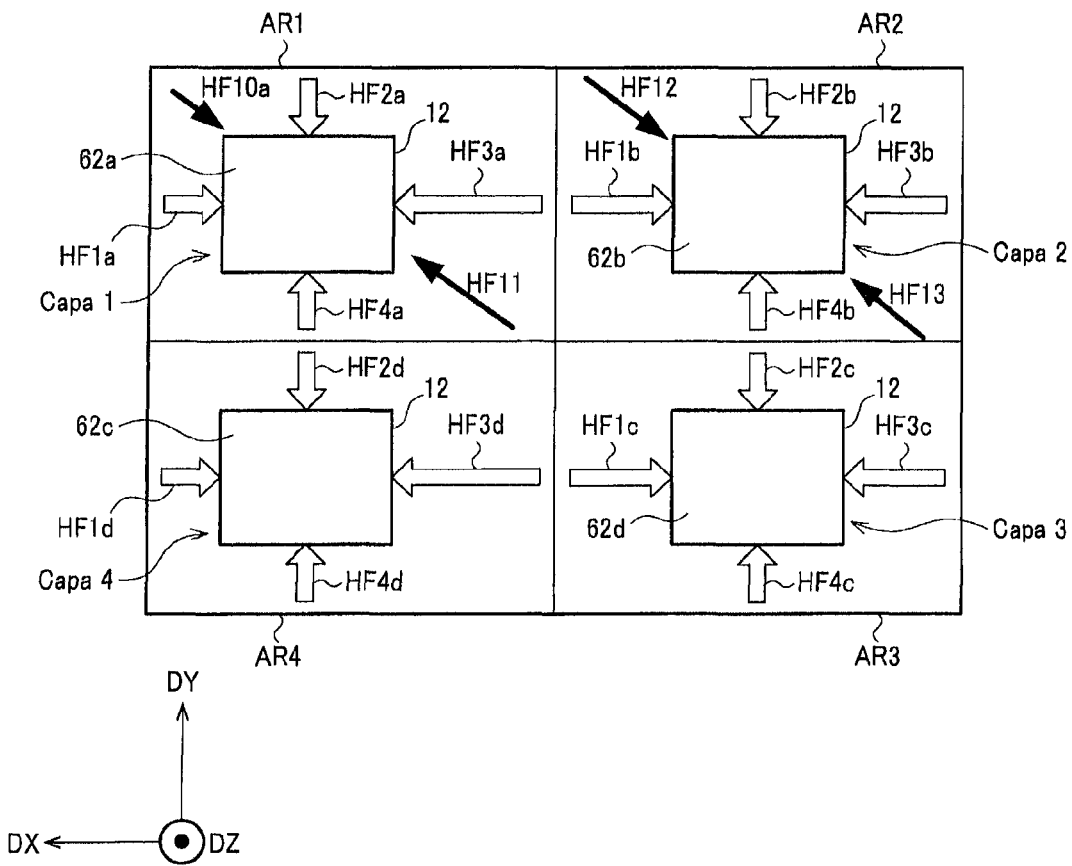
FIG. 9A is a drawing showing the layout of the light absorption regions and the pyroelectric bodies of the pyroelectric capacitors for which the heat transfer is uneven.
Figure 9B:
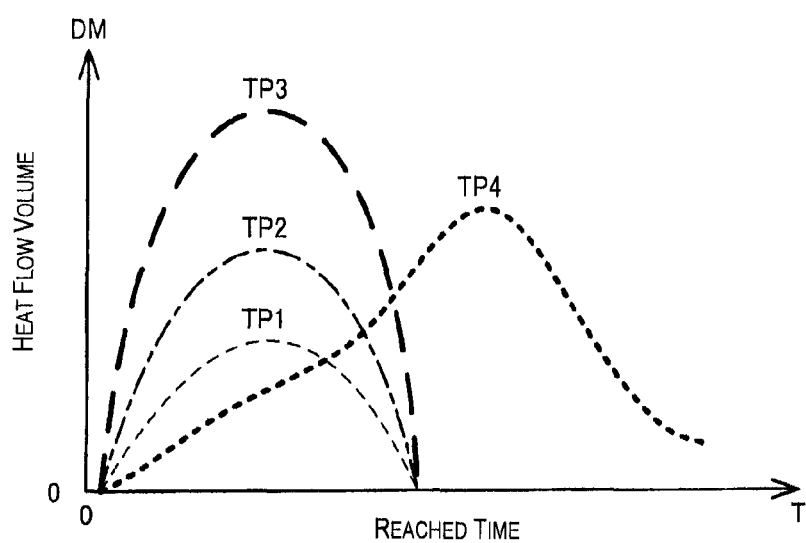
FIG. 9B is a drawing showing the uneven heat transfer characteristics.

FIG. 9A and FIG. 9B show uneven heat transfer structures and heat transfer characteristics. FIG. 9A shows a layout example for which the conditions described with FIG. 2 and FIG. 8 are not met. In this case, with each of the light absorption regions AR1 to AR4, the length of the heat transfer path to reach from the peripheral edge of the light absorption regions AR1 to AR4 to the pyroelectric body 12 differs individually.

FIG. 9B shows an example of uneven heat transfer characteristics. With the example in FIG. 9B, the peak positions of the heat flow volume TP1 to TP3 with three of the four pyroelectric bodies 12 are matched, but the peak levels of the heat flow volumes TP1 to TP3 are different. What is worse is that the peak position of the remaining one heat flow volume TP4 of the four pyroelectric bodies 12 is skewed from the peak positions of the other three heat flow volumes TP1 to TP3. Thus, when sampling is done at a certain time of the heat flow volumes TP1 to TP4, when compared to an item for which the peak positions and peak levels of the four heat flow volumes TP1 to TP4 are matched, we can see that the output voltage Vs decreases. With this embodiment, it is possible to make the peak positions and the peak levels of the four heat flow volumes TP1 to TP4 match to be almost the same.

Figure 10:
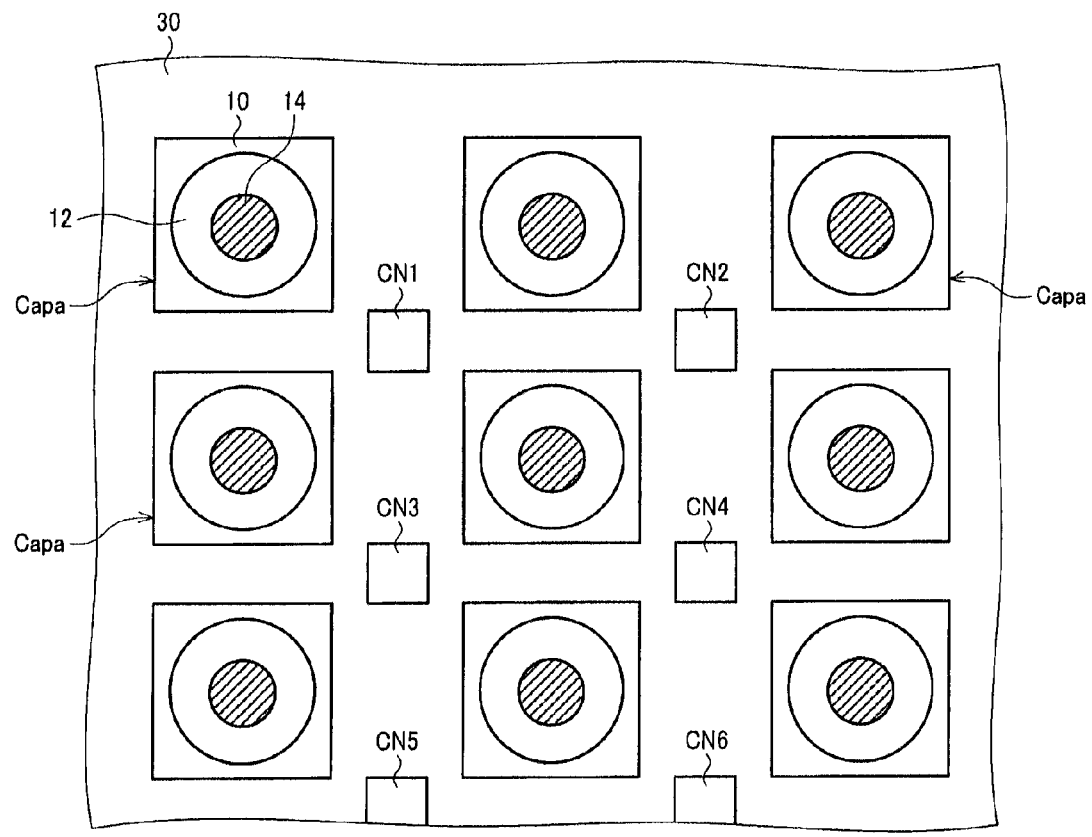
FIG. 10 is a plan view of a support member on which through holes are formed between a plurality of pyroelectric capacitors.

With this embodiment, since a plurality of pyroelectric capacitors Capa are installed on one support member 30, a space is ensured between two adjacent pyroelectric capacitors Capa of the plurality of pyroelectric capacitors Capa. In light of this, as shown in FIG. 10, the support member 30 is able to have at least one through hole CN1 to CN6 in the region between two adjacent pyroelectric capacitors Capa of the plurality of pyroelectric capacitors Capa.

Here, when forming the support member 30, the pyroelectric capacitor Capa or the like on the base unit 20 in the hollow space section 102 shown in FIG. 5, a sacrifice layer is embedded. Then, after a layer which is the support member 30 is formed on the entire base unit 20, and a pyroelectric capacitor Capa or the like is formed on that material layer, the material layer which is the support member 30 is etched into a shape of support member 20 having two arms 30-1 and 30-2 as shown in FIG. 4, for example. At the time of this etching, the through holes CN1 to CN6 shown in FIG. 5 are also formed simultaneously.

The sacrifice layer undergoes isotropic etching using an etchant, and the through holes CN1 to CN6 are used as etchant supply ports. By doing that, it is easier for the etchant to wrap around the lower sacrifice layer of the support member 30, making it easier to remove the sacrifice layer using isotropic etching.

2. Second Embodiment

Figure 11:
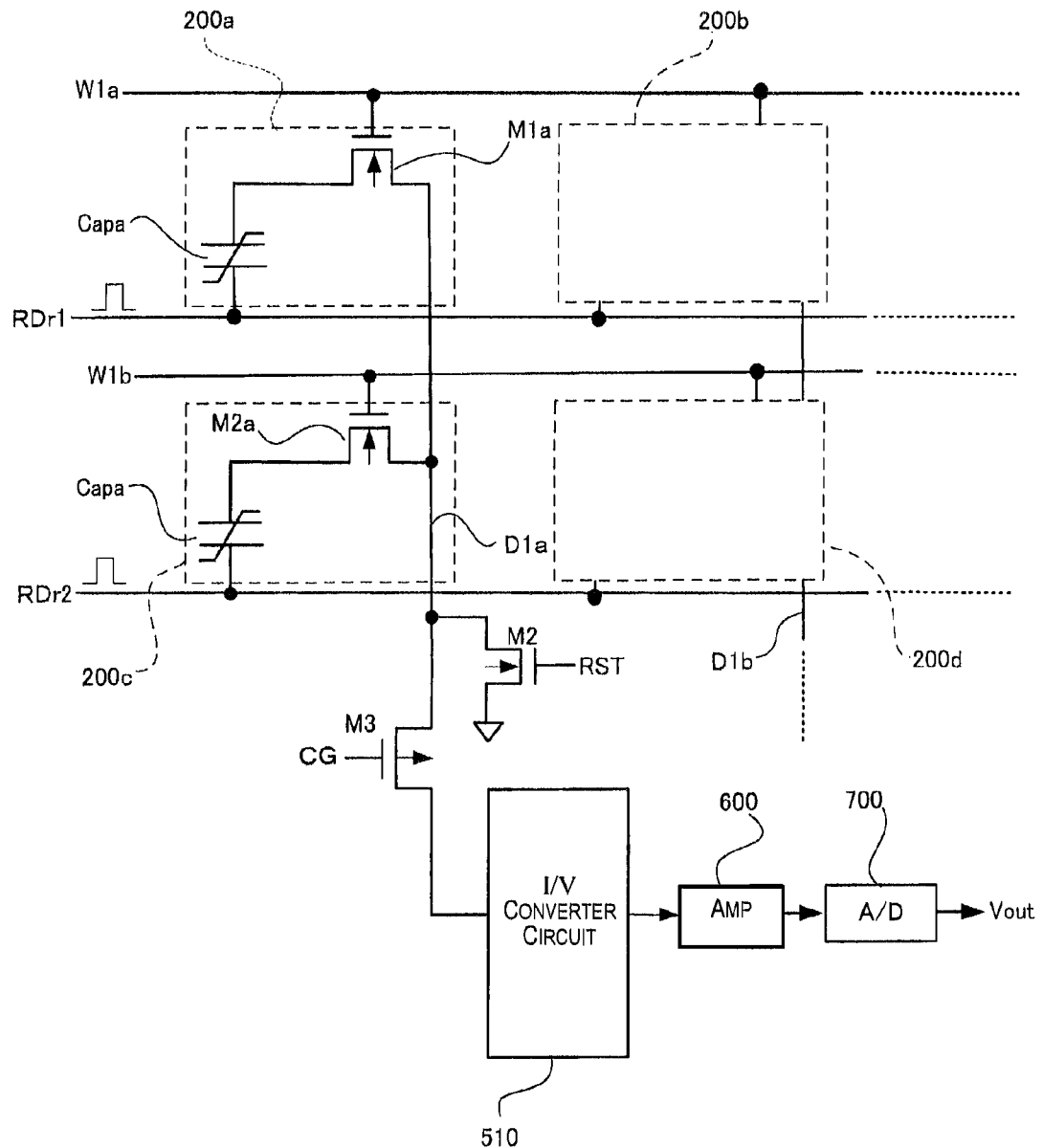
FIG. 11 is a circuit diagram showing an example of the circuit configuration of the pyroelectric light detecting device (pyroelectric light detecting array) of the second embodiment of the invention.

FIG. 11 is a circuit diagram showing an example of the circuit configuration of the pyroelectric light detecting device (pyroelectric light detecting array). With the example of FIG. 11, a plurality of light detecting cells (specifically, pyroelectric light detectors 200a to 200d or the like) are arranged two dimensionally. The pyroelectric capacitor Capa shown in FIG. 11 has a plurality of items serially connected as described above. To select one light detecting cell from among the plurality of light detecting cells (pyroelectric light detectors 200a to 200d or the like), scan lines (W1a, W1b, and the like) and data lines (D1a, D1b and the like) are provided.

The pyroelectric light detector 200a as a first light detecting cell has a plurality of serially connected pyroelectric capacitors Capa and an element selection transistor M1a. The electric potential relationship of both electrodes of the pyroelectric capacitor Capa is definitively determined by the direction of the electric field E as shown in FIG. 3 by the electric potential applied to the driver PDr1. During light detection, the output of the driver PDr1 is grounded. The other light detecting cells also have the same configuration. The size of the region occupied by one light detecting cell can be 20 μm×20 μm, for example.

The electric potential of the data line D1a can be initialized by turning on the reset transistor M2. During reading of the detection signals, the read transistor M3 is turned on. The current that occurs due to the pyroelectric effect is converted to voltage by an I/V converter circuit 510, this is amplified by an amp 600, and is converted to digital data by an A/D converter 700.

With this embodiment, if the plurality of pyroelectric light detectors are arranged two dimensionally (for example arranged in an array form along each of two orthogonal axes (X axis and Y axis)), the pyroelectric light detecting device (pyroelectric light array sensor) is realized.

3. Third Embodiment

With this embodiment, we will describe electronic devices.

3.1 Infrared Camera

Figure 12:
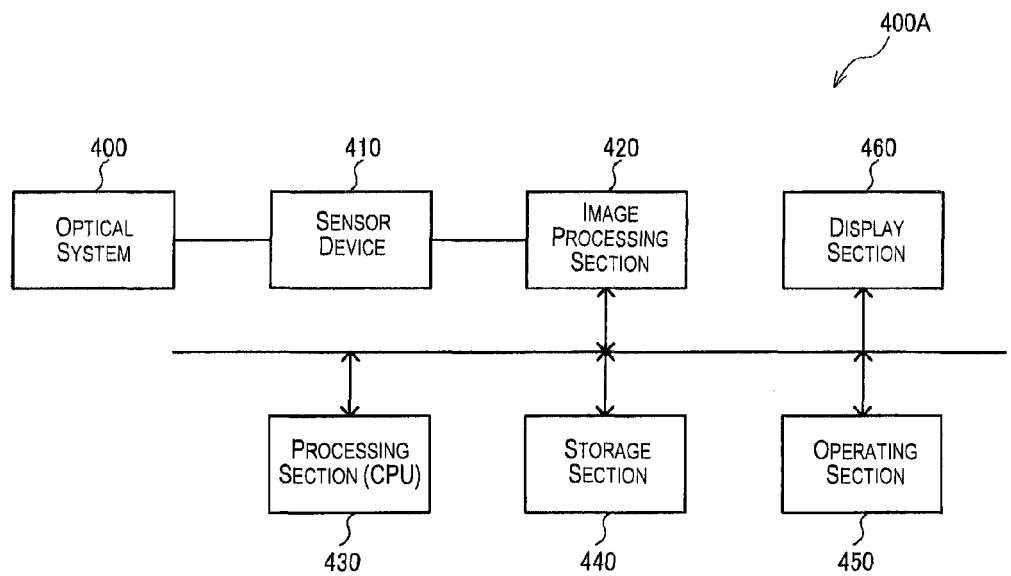
FIG. 12 is a block diagram of an infrared camera (electronic device) of a third embodiment of the invention including a pyroelectric light detector or pyroelectric light detecting device.

FIG. 12 shows a configuration example of an infrared camera 400A as an example of an electronic device containing the pyroelectric light detector or the pyroelectric light detecting device of this embodiment. This infrared camera 400A includes an optical system 400, a sensor device (pyroelectric light detecting device) 410, an image processing section 420, a processing section 430, a storage section 440, an operating section 450, and a display section 460.

The optical system 400 includes for example one or a plurality of lenses, a driving section for driving these lenses or the like. Then, it performs imaging or the like of subject images to the sensor device 410. It also performs focus adjustment or the like if necessary.

The sensor device 410 is constituted with the pyroelectric light detectors 200 of this embodiment described above arranged two dimensionally, and a plurality of row lines (word lines, scan lines) and a plurality of column lines (data lines) are provided. The sensor device 410, in addition to detectors arranged two dimensionally, can also include a row selection circuit (row driver), a read circuit for reading data from the detector via the column line, an A/D converter or the like. By sequentially reading the data from each detector arranged two dimensionally, it is possible to perform imaging processing of the subject image.

The image processing section 420 performs various types of image processing such as image correction processing based on digital image data (pixel data) from the sensor device 410.

The processing section 430 performs overall control of the infrared camera 400A, and performs control of each block within the infrared camera 400A. This processing section 430 is realized using a CPU or the like, for example. The storage section 440 is for storing various types of information, and for example functions as a work area of the processing section 430 and the image processing section 420. The operating section 450 is an interface for the user to operate the infrared camera 400A, and for example can be realized using various buttons or a GUI (Graphical User Interface) screen or the like.

The display section 460 displays images fetched by the sensor device 410, the GUI screen or the like, and is realized using various types of display such as a liquid crystal display, an organic EL display or the like.

In this way, in addition to using one cell of pyroelectric light detectors as a sensor such as an infrared sensor or the like, it is also possible to constitute a sensor device 410 by two dimensionally arranging one cell of pyroelectric light detectors in two axis directions, for example two orthogonal axis directions, and by doing this, it is possible to provide a heat (light) distribution image. Using this sensor device 410, it is possible to constitute an electronic device such as for thermography, in-vehicle night vision, a surveillance camera or the like.

Of course, by using one cell or a plurality of cells of pyroelectric light detectors as a sensor, it is also possible to constitute various types of electronic devices such as analytical equipment (measuring equipment) for performing analysis (measurement) of physical information of objects, security devices for detecting fire or heat generation, FA (factory automation) equipment provided in factories or the like.

3.2 Driving Support Device

Figure 13:
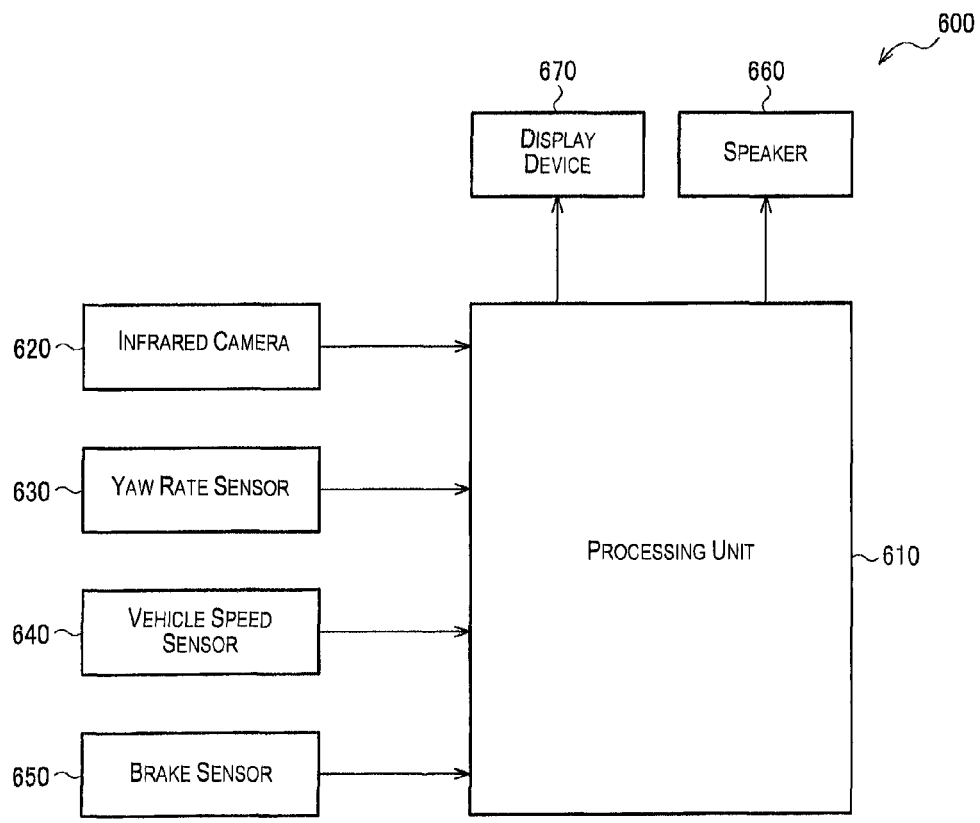
FIG. 13 is a drawing showing the driving support device (electronic device) of the third embodiment of the invention including an infrared camera.

FIG. 13 shows a structural example of a driving support device 600 as an example of an electronic device including the pyroelectric light detector or pyroelectric light detecting device of this embodiment. This driving support device 600 is constituted equipped with a processing unit 610 equipped with a CPU for controlling the driving support device 600, an infrared camera 620 that can detect infrared rays in relation to designated imaging areas outside a vehicle, a yaw rate sensor 630 for detecting the yaw rate of a vehicle, a vehicle speed sensor 640 for detecting the vehicle running speed, a brake sensor 650 for detecting whether or not the operator is operating the brakes, a speaker 660, and a display device 670.

The processing unit 610 of this driving support device 600 detects subjects such as objects or pedestrians that exist in the driving direction front of an automobile from an infrared image of near the automobile obtained by imaging of the infrared camera 620 and detection signals relating to the running status of the automobile detected by each sensor 630 to 650, and when it is determined that there is a possibility of contact occurring between the detected subject and the automobile, a warning is output by the speaker 660 or the display device 670.

Figure 14:
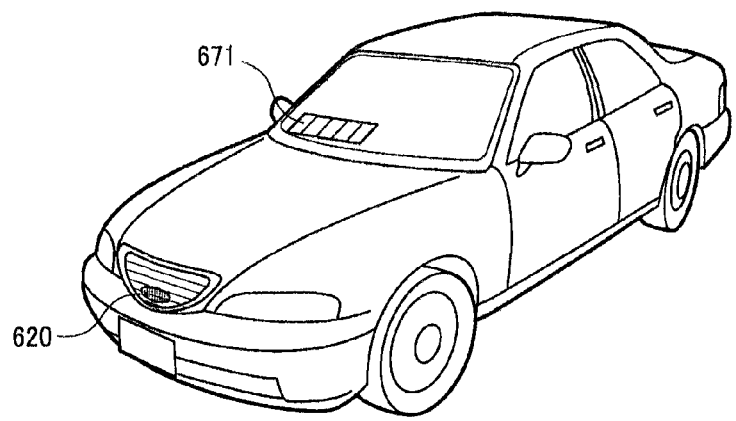
FIG. 14 is a drawing showing a vehicle of the third embodiment of the invention in which the infrared camera is installed in the front.

Also, for example as shown in FIG. 14, the infrared camera 620 is arranged near the center of the car width direction at the front of the vehicle. The display device 670 is constituted equipped with a HUD (Head UP Display) 671 for displaying various types of information at a position in the front window that does not obstruct the front field of vision of the operator.

3.3 Security Device

Figure 15:
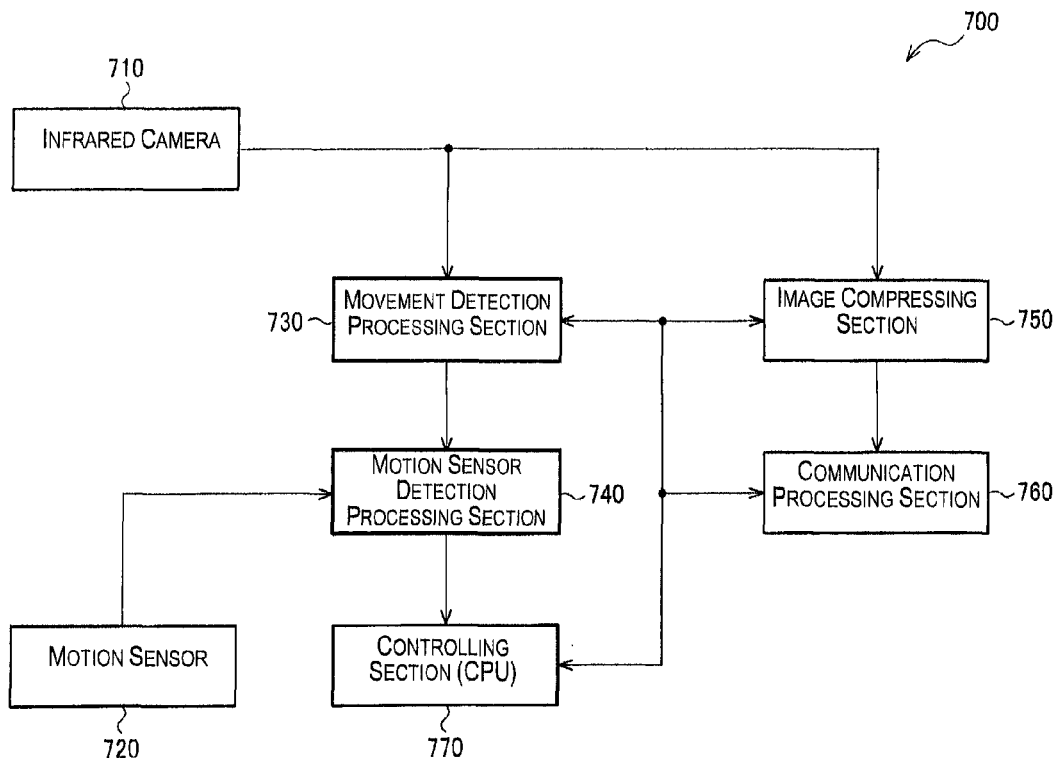
FIG. 15 is a drawing showing the security device (electronic device) of the third embodiment of the invention including an infrared camera.

FIG. 15 shows a structural example of a security device 700 as an example of an electronic device including a pyroelectric light detector or pyroelectric light detecting device of this embodiment.

The security device 700 is constituted equipped with an infrared camera 710 that photographs at least the surveillance area, a motion sensor 720 for detecting intruders to the surveillance area, a movement detection processing section 730 for detecting a moving body that has intruded into the surveillance area by processing image data output from the infrared camera 710, a motion sensor detection processing section 740 for performing detection processing of the motion sensor 720, an image compression section 750 for compressing using a designated method the image data output from the infrared camera 710, a communication processing section 760 for sending compressed image data or intruder detection information or for receiving various types of setting information or the like to the security device 700 from an external device, and a control section 770 which performs using a CPU the setting of conditions for each processing section of the security device 700, sending of processing commands, and response processing.

The movement detection processing section 730 is equipped with (not illustrated) a buffer memory, a block data smoothing section to which the output of the buffer memory is input, and a status change detection section to which the output of the block data smoothing section is input. Also, with the status change detection section of the movement detection processing section 730, if the surveillance area is in a still state, even with a different frame taken with video, the result is the same image data, but when there is a status change (intrusion of a moving body), a difference occurs in the image data between frames, and this is used to detect the status change.

Figure 16:
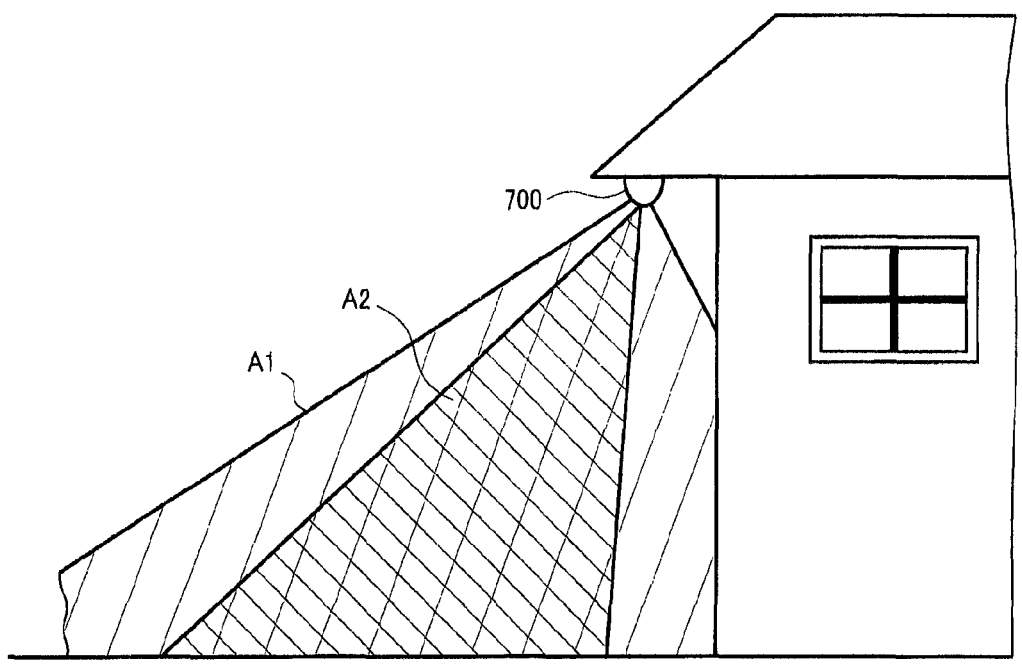
FIG. 16 is a drawing showing the security device infrared camera and the motion sensor detection area.

Also, FIG. 16 shows the security device 700 installed under the eaves, for example, and an item shown from the side surface of imaging area A1 of the infrared camera 710 and detection area A2 of the motion sensor 720 incorporated in the security device 700.

3.4 Game Device

Figure 17:
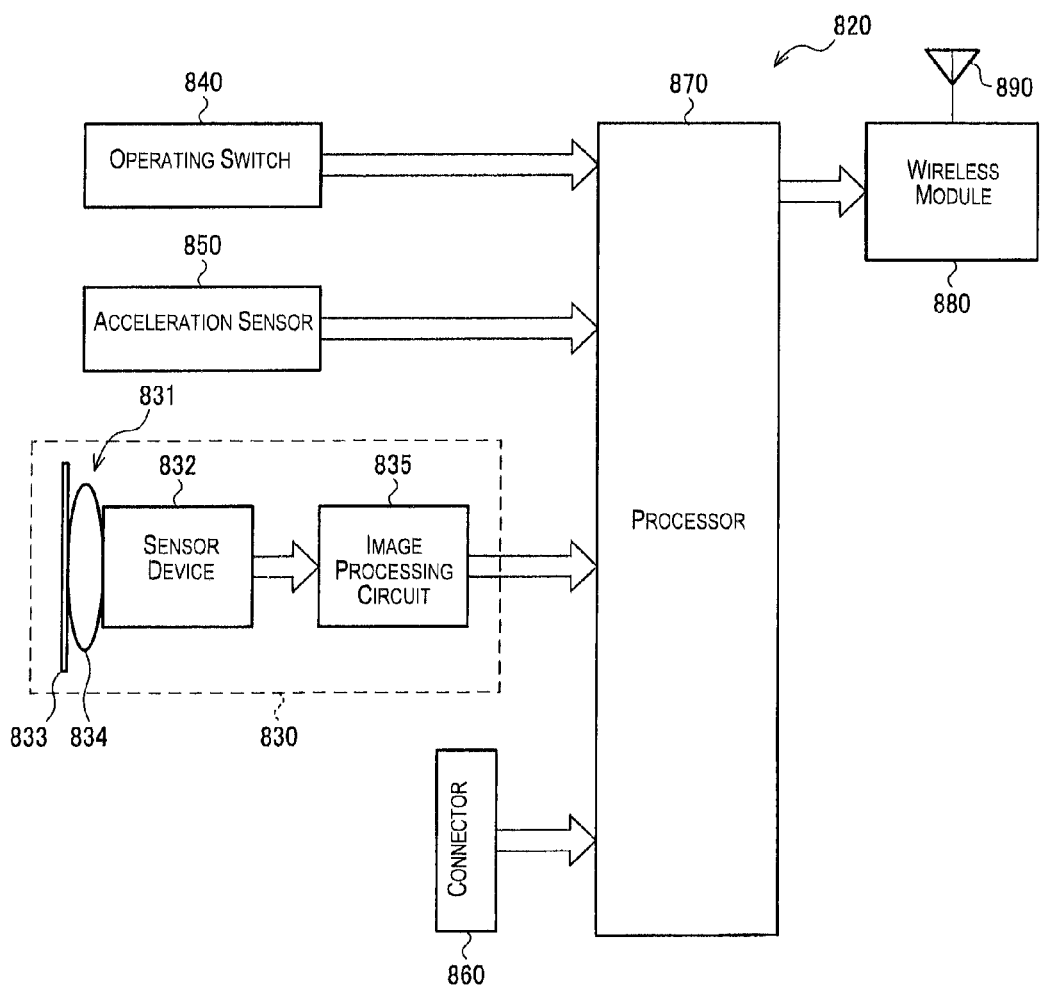
FIG. 17 is a drawing showing a controller used for a game device of the third embodiment of the invention including a sensor device.
Figure 18:
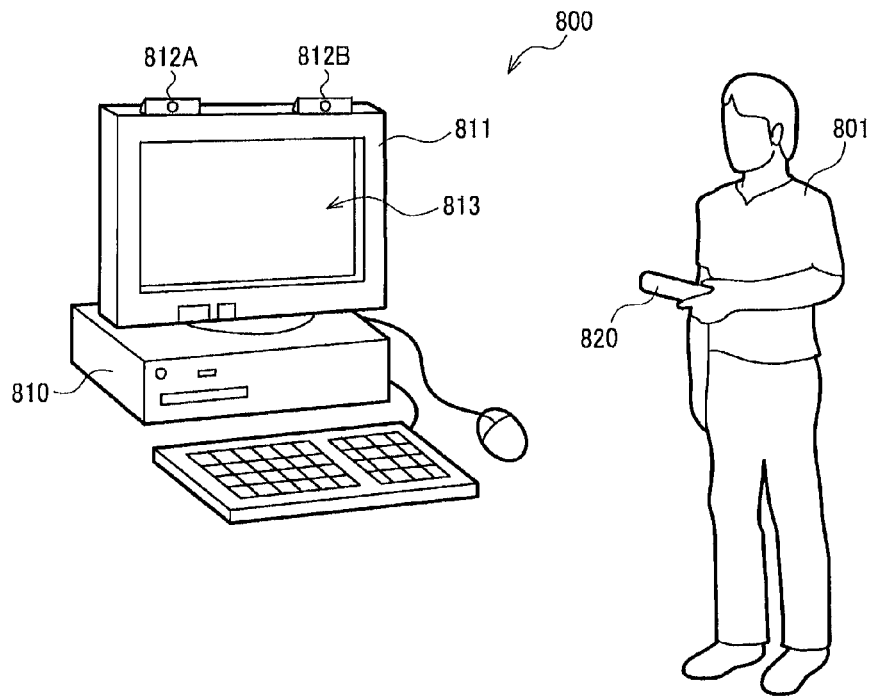
FIG. 18 is a drawing showing a game device including a controller.

FIG. 17 and FIG. 18 shows a structural example of a game device 800 including a controller 820 using the previously described sensor device 410 as an example of an electronic device including a pyroelectric light detector or pyroelectric light detecting device of this embodiment.

As shown in FIG. 17, the controller 820 used for the game device 800 of FIG. 18 is equipped with an imaging information calculation unit 830, an operating switch 840, an acceleration level sensor 850, a connector 860, a processor 870, and a wireless module 880.

The imaging information calculation unit 830 has an imaging unit 831, and an image processing circuit 835 for processing the image data imaged by this imaging unit 831. The imaging unit 831 includes a sensor device 832 (sensor device 410 of FIG. 12), and at the front are arranged an infrared filter (filter that passes only infrared rays) 833 and an optical system (lens) 834. Then, the image processing circuit 835 processes the infrared image data obtained from the imaging unit 831, detects the high brightness parts, detects the center of gravity position and surface area, and outputs these data.

The processor 870 outputs as a series of control data the operating data from the operating switch 840, the acceleration level data from the acceleration level sensor 850, and the high brightness part data. The wireless module 880 modulates carrier waves of designated frequencies with this control data, and outputs it as electric wave signals from an antenna 890.

The data input through the connector 860 provided on the controller 820 is also processed in the same manner as the previously described data by the processor 870 and is output as control data via the wireless module 880 and the antenna 890.

As shown in FIG. 18, the game device 800 is equipped with the controller 820, the game main unit 810, the display 811, and the LED modules 812A and 812B, and it is possible to play the game while the player 801 grips the controller 820 with one hand. Then, when making the imaging unit 831 of the controller 820 face the screen 813 of the display 811, the imaging unit 831 detects the infrared rays output from the two LED modules 812A and 812B arranged near the display 811, and the controller 820 acquires as high brightness point information the position and surface area information of the two LED modules 812A and 812B. Data such as the brightness point position and size is sent to the game device main unit 810 wirelessly from the controller 820, and is received at the game device main unit 810. When the player 801 operates the controller 820, the brightness point position and size data changes, so using that, it is possible for the game device main unit 810 to acquire the operating signals corresponding to the movement of the controller 810, making it possible to have the game progress in accordance with that.

3.5 Body Temperature Measuring Device

Figure 19:
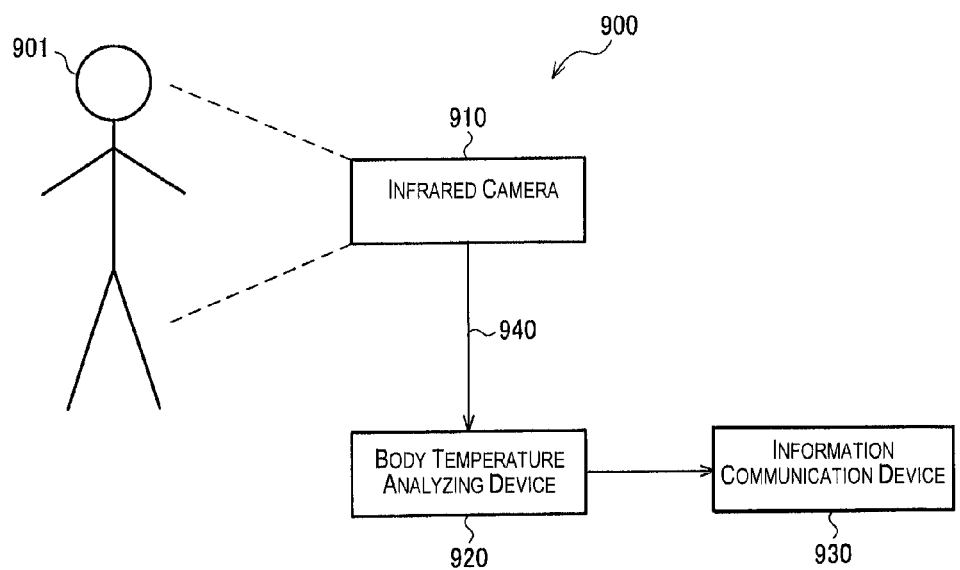
FIG. 19 is a drawing showing a temperature measuring device (electronic device) of the third embodiment of the invention including an infrared camera.

FIG. 19 shows a structural example of a body temperature measuring device 900 as an example of an electronic device including a pyroelectric light detector or pyroelectric light detecting device of this embodiment.

As shown in FIG. 19, the body temperature measuring device 900 is constituted equipped with an infrared camera 910, a body temperature analysis device 920, an information communication device 930, and a cable 940. The infrared camera 910 is constituted including an optical system such as a lens (not illustrated) and the previously described sensor device 410.

The infrared camera 910 does imaging of a designated subject area, and sends the image information of the imaged subject 901 via the cable 940 to the body temperature analysis device 920. The body temperature analysis device 920 includes (not illustrated) an image fetching processing unit for reading the heat distribution images from the infrared camera 910, and a body temperature analysis processing unit for creating a body temperature analysis table based on the image analysis setting table, and sends body temperature information sending data based on the body temperature analysis table to the information communication device 930. This body temperature information sending data can also include designated data corresponding to the fact that the body temperature is abnormal. Also, when it is determined that a plurality of subjects 901 are included within the imaging area, it is also possible to include information of the number of subjects 901 and the number of abnormal body temperature subjects in the body temperature information sending data.

3.6 Specific Substance Detecting Device

Figure 20:
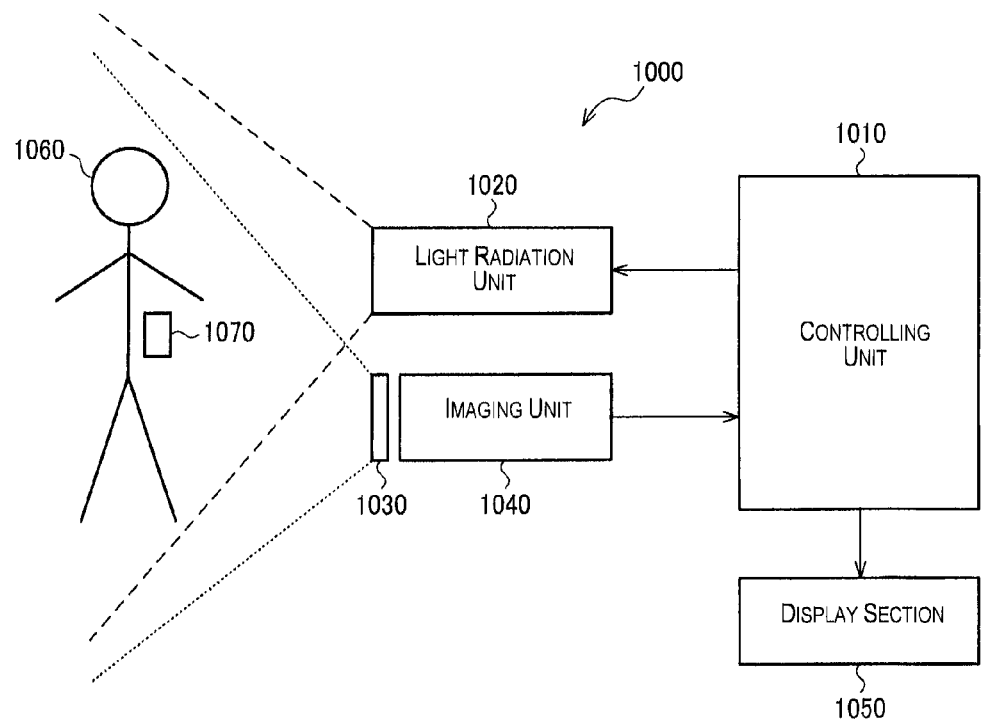
FIG. 20 is a drawing showing an example of constituting a specific substance detection device (electronic device) combined with a terahertz irradiation unit using a terahertz sensor device as the sensor device.

As an example of an electronic device including a pyroelectric light detector or pyroelectric light detecting device of this embodiment, FIG. 20 shows an example constituting a specific substance detecting device 1000 which is combined with a terahertz light radiating unit using as a terahertz light sensor device a sensor device that uses terahertz waves for the absorption wavelength of the light absorbing material of the pyroelectric light detector of the previously described sensor device 410.

The specific substance detecting device 1000 is constituted equipped with a control unit 1010, a light radiation unit 1020, an optical filter 1030, an imaging unit 1040, and a display section 1050. The imaging unit 1040 is constituted including an optical system such as a lens (not illustrated), and a sensor device that uses terahertz waves for the absorption wavelength of the light absorbing material of the previously described pyroelectric light detector.

The control unit 1010 includes a system controller for controlling the overall main device, and that system controller controls the light source driving section and image processing unit contained in the control unit. The light radiating unit 1020 includes a laser device that emits terahertz light (indicates electromagnetic waves for which the wavelengths are in the range of 100 μm to 1000 μm), and radiates terahertz light on person 1060 which is the test subject. The reflected terahertz light from the person 1060 is received on the imaging unit 1040 via the optical filter 1030 which transmits only the optical spectrum of the specific substance 1070 which is the subject of detection. The image signals generated by the imaging unit 1040 undergo designated image processing by the image processing unit of the control unit 1010, and those image signals are output to the display section 1050. Then, the intensity of the light receiving signals differs according to whether or not there is the specific substance 1070 inside clothing or the like of the person 1060, so it is possible to determine whether or not the specific substance 1070 exists.

Above, we described embodiments of several electronic devices, but the electronic devices of the embodiments noted above are not limited to the described constitutions, and it is possible to implement various modifications such as omitting a part of the structural elements (e.g. the optical system, operating unit, display unit or the like), adding other structural elements or the like.

3.7 Sensor Device

Figure 21A:
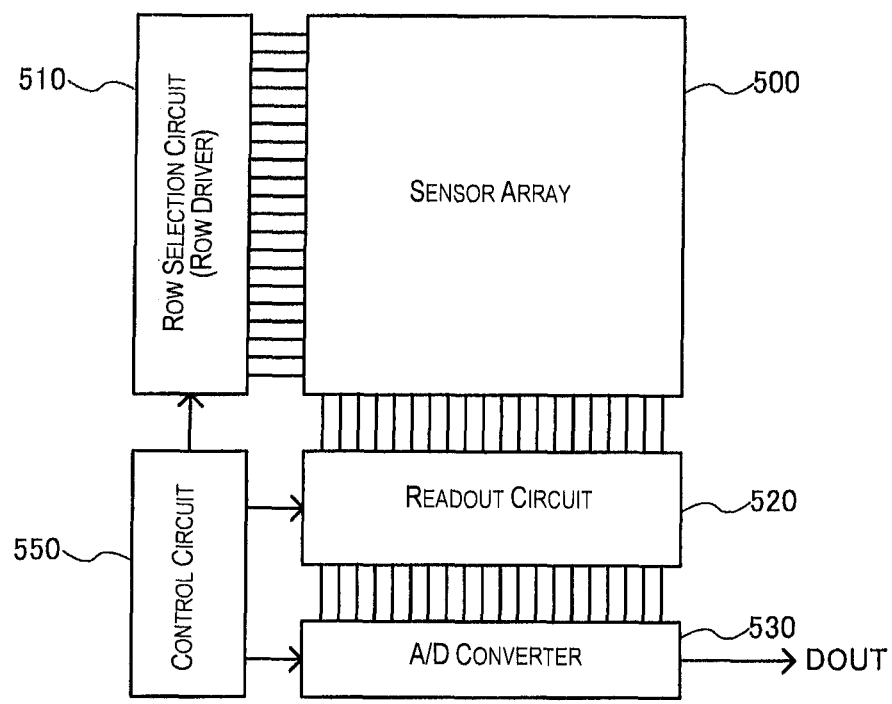
FIGS. 21A and 21B are drawings showing structural examples of pyroelectric light detecting devices for which pyroelectric light detectors are arranged two dimensionally.

FIG. 21A shows a configuration example of the sensor device 410 of FIG. 19. This sensor device includes a sensor array 500, a row selection circuit (row driver) 510, and a read circuit 520. It can also include an A/D converter 530 and a control circuit 550. The row selection circuit (row driver) 510 and the read circuit 520 are called drive circuits. By using this sensor device, it is possible to realize an infrared camera 400A or the like used in night vision devices or the like shown in FIG. 12, for example.

A plurality of sensor cells are arrayed (arranged) in two axis directions as shown in FIG. 11, for example, on the sensor array 500. Also, a plurality of row lines (word lines, scan lines) and a plurality of column lines (data lines) are provided. It is also possible to have one of the row lines and column lines be a count of 1. For example, when there is 1 row line, a plurality of sensor cells are arrayed in the direction along the row line (horizontal direction) in FIG. 21A. Meanwhile, when there is 1 column line, a plurality of sensor cells are arrayed in the direction along the column line (vertical direction).

Figure 21B:
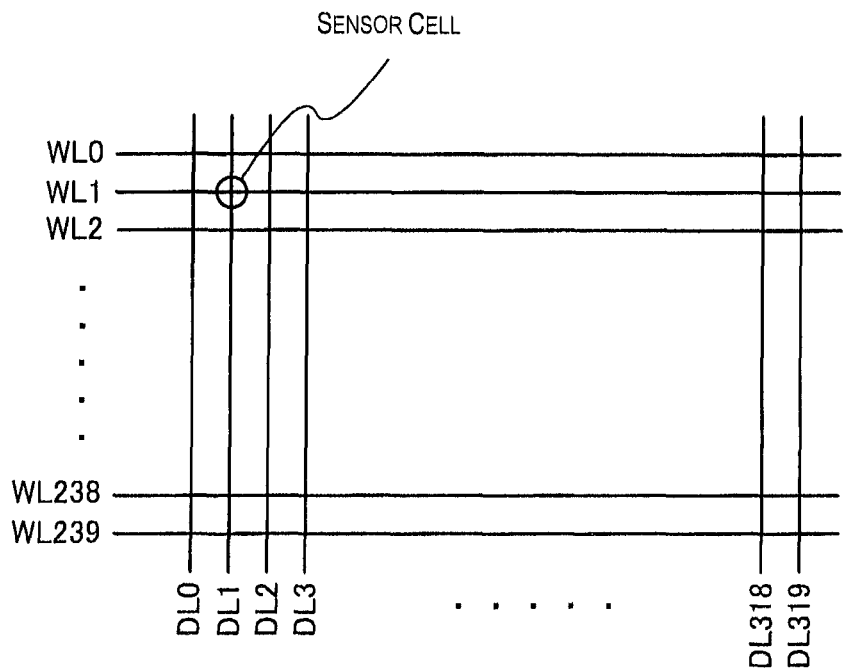

As shown in FIG. 21B, each of the sensor cells of the sensor array 500 is arranged (formed) at locations corresponding to the intersecting positions of each row line and each column line. For example, the sensor cell of FIG. 21B is arranged at the location corresponding to the intersection position of the row line WL1 and the column line DL1. The same is also true for the other sensor cells.

The row selection circuit 510 is connected to one or a plurality of row lines. Then a selection operation is performed for each row line. For example using an example of the sensor array 500 (focal surface array) of the QVGA (320×240 pixels) such as in FIG. 21B, the operation of sequentially selecting (scanning) the row lines WL0, WL1, WL2, ... WL239 is performed. Specifically, signals for selecting these row lines (word selection signals) are output to the sensor array 500.

The read circuit 520 is connected to one or a plurality of column lines. Then, the operation of reading each column line is performed. Using an example of the sensor array 500 of QVGA, the operation of reading the detection signals (detection current, detection charge) from the column lines DL0, DL1, DL2, ... DL319 is performed.

The A/D converter 530 performs the process of A/D conversion of the detected voltage (measurement voltage, reached voltage) acquired at the read circuit 520 to digital data. Then, after A/D conversion, digital data DOUT is output. In specific terms, A/D converters corresponding to each column line of the plurality of column lines are provided in the A/D converter 530. Then, each A/D converter performs A/D conversion processing of the detected voltage acquired by the read circuit 520 for the corresponding column line. It is also possible to provide one A/D converter corresponding to the plurality of column lines, and using this one A/D converter, to do A/D conversion with time division of the detected voltage of the plurality of column lines.

The control circuit 550 (timing generating circuit) generates various types of control signals and outputs them to the row selection circuit 510, the read circuit 520, and the A/D converter 530. For example it can generate charge and discharge (reset) control signals and output them. Alternatively, it can generate signals for controlling the timing of each circuit and output those.

Above, we described several embodiments, but it is easily understood by those skilled in the art that many variations are possible without essentially straying from the novel items and effect of the invention. Therefore, all of these kind of modification examples are included within the scope of the invention. For example, in the specification or drawings, terminology that is noted at least once together with a different term with a broader meaning or synonymous meaning can be used to replace that different terminology in any location of the specification or drawings. For example, base unit indicates any kind of support structure such as a substrate, base or foundation, support foundation or the like.

The invention can be widely applied to various types of pyroelectric light detectors. The detected light wavelength does not matter. Also, the pyroelectric light detector or pyroelectric light detecting device, or electronic devices having those, can be applied to a flow sensor or the like for detecting the flow volume of a fluid under conditions in which the supplied heat volume is balanced with the heat volume taken by fluid. It is possible to provide the pyroelectric type detector or pyroelectric type detection device of the invention instead of a thermocouple or the like provided in this flow sensor, and it is possible to have a detection subject other than light.

As described above, with at least one of the embodiments of the invention, for example, it is possible to dramatically improve the detection sensitivity of a pyroelectric light detector, for example.

As noted above, we gave a detailed description of embodiments of the invention, but it is easy for a person skilled in the art to understand that it is possible to have many variations that do not essentially stray from the novel items and effect of the invention. Therefore, all of this kind of modification example is included in the scope of the invention.

What is claimed is:

1. A pyroelectric light detector comprising:
a base unit,
support members including a first surface and a second surface facing opposite the first surface, arranged via a hollow space section between the second surface and the base unit, and
a plurality of pyroelectric capacitors supported by the support members and respectively containing pyroelectric bodies, wherein the plurality of pyroelectric capacitors are electrically connected in series in the direction that matches the polarization direction.

2. The pyroelectric light detector according to claim 1, wherein
each of the pyroelectric bodies of the plurality of pyroelectric capacitors has the side surface covered by an electrically insulated metal compound layer.

3. The pyroelectric light detector according to claim 2, wherein
each of the plurality of pyroelectric capacitors comprises a first electrode provided on the support member, a second electrode facing opposite the first electrode via the pyroelectric body, and a wiring section connected to a region of the first electrode not facing opposite the second electrode.

4. The pyroelectric light detector according to claim 3, wherein
the metal compound layer is formed covering a region of the first electrode not facing opposite the second electrode,
an insulating layer covering the metal compound layer is further provided, and
the wiring section is connected through the openings of the insulating layer and the openings of the metal compound layer.

5. The pyroelectric light detector according to claim 1, wherein
each of the plurality of pyroelectric capacitors includes a first electrode provided on the support member, and a second electrode facing opposite the first electrode via the pyroelectric body, and
between the first electrodes of two pyroelectric capacitors that are electrically connected in series in the direction that match the polarization direction is made conductive.

6. The pyroelectric light detector according to claim 5, wherein
the first electrodes of the two pyroelectric capacitors that are electrically connected in series in the direction that matches the polarization direction are common electrodes.

7. The pyroelectric light detector according to claim 1, comprising
a first wiring section connected to both ends of a capacitor row consisting of the plurality of pyroelectric capacitors that are electrically connected in series in the direction that matches the polarization direction, and
a second wiring section connecting between the plurality of pyroelectric capacitors,
wherein the width of the first wiring section is narrower than the width of the second wiring section.

8. A pyroelectric light detecting device for which the pyroelectric light detectors according to claim 1 are two-dimensionally arranged along two intersecting straight line directions.

9. An electronic device having the pyroelectric light detecting device according to claim 8.

10. An electronic device having the pyroelectric light detector according to claim 1.

11. A pyroelectric light detector comprising
a base unit,
support members including a first surface and a second surface facing opposite the first surface, arranged via a hollow space section between the second surface and the base unit,
a plurality of pyroelectric capacitors supported by the support member and respectively containing pyroelectric bodies, and
a light absorbing layer provided in contact respectively with the plurality of pyroelectric capacitors,
wherein the plurality of pyroelectric capacitors are electrically connected,
the light absorbing layer consists of a plurality of light absorption regions corresponding to each of the plurality of pyroelectric capacitors, and
with a plan view from the base unit thickness direction, the center of gravity of each of the plurality of light absorption regions exists at a position overlapping the pyroelectric body of each one of the pyroelectric capacitors to which each of the plurality of light absorption regions corresponds.

12. The pyroelectric light detector according to claim 11, wherein
with the aforementioned plan view, the center of gravity of each of the plurality of light absorption regions has an overlap with the center of gravity of the pyroelectric body of each one of the pyroelectric capacitors to which each of the plurality of light absorption regions corresponds.

13. The pyroelectric light detector according to claim 11, wherein
the pyroelectric body of each of the plurality of pyroelectric capacitors has a contour which is an n (where n is an integer of 3 or greater) sided polygon, and includes from a first contour line to an nth contour line,
each of the contours of the plurality of light absorption regions corresponding to each of the plurality of pyroelectric capacitors has an mth opposing contour line facing opposite the mth contour line of the pyroelectric body ($1 \leq m \leq n$), and
the distance dm between the mth contour line and the mth opposing contour line is fixed regardless of the value of m.

14. The pyroelectric light detector according to claim 11, wherein
the contour of each of the pyroelectric bodies of the plurality of pyroelectric capacitors is a circle or an oval.

15. The pyroelectric light detector according to claim 11, wherein
each of the plurality of pyroelectric capacitors includes a first electrode and a second electrode sandwiching the pyroelectric body, and is a planar type capacitor for which the first electrode is supported by the support member, and the surface area of the first electrode with the aforementioned plan view is larger than the surface area of the second electrode.

16. The pyroelectric light detector according to claim 11, wherein
each of the pyroelectric bodies of the plurality of pyroelectric capacitors has its side surface covered by an electrically insulating metal compound layer.

17. The pyroelectric light detector according to claim 11, wherein
the light absorbing layer consists of a plurality of light absorbing layers formed divided corresponding to each of the plurality of pyroelectric capacitors.

18. The pyroelectric light detector according to claim 17, wherein
the support member has through holes at the region between two adjacent pyroelectric capacitors among the plurality of pyroelectric capacitors.

19. A pyroelectric light detecting device for which the pyroelectric light detectors according to claim 11 are arranged two-dimensionally along two intersecting straight line directions.

20. An electronic device having the pyroelectric light detecting device according to claim 19.

21. An electronic device having the pyroelectric light detector according to claim 11.

* * * * *